(12) United States Patent
Kida et al.

(10) Patent No.: US 11,307,710 B2
(45) Date of Patent: Apr. 19, 2022

(54) POSITION DETECTING DEVICE INCLUDING ANTENNA FUNCTION AND DISPLAY DEVICE

(71) Applicant: SHARP KABUSHIKI KAISHA, Sakai (JP)

(72) Inventors: Kazutoshi Kida, Sakai (JP); Takenori Maruyama, Sakai (JP); Takuma Yamamoto, Sakai (JP); Yasuhiro Sugita, Sakai (JP); Shinji Yamagishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 99 days.

(21) Appl. No.: 16/894,296

(22) Filed: Jun. 5, 2020

(65) Prior Publication Data
US 2020/0393932 A1 Dec. 17, 2020

Related U.S. Application Data

(60) Provisional application No. 62/860,987, filed on Jun. 13, 2019.

(51) Int. Cl.
*G06F 3/041* (2006.01)
*G06F 3/044* (2006.01)
*H01Q 1/22* (2006.01)

(52) U.S. Cl.
CPC .......... *G06F 3/0418* (2013.01); *G06F 3/0446* (2019.05); *G06F 3/04164* (2019.05); *H01Q 1/22* (2013.01)

(58) Field of Classification Search
CPC ...... G06F 3/0416; G06F 3/0412; G06F 3/044; G06F 2203/04106; G06F 3/04164; G06F 3/0446; G06F 3/0445; G06F 3/04166; G09G 2300/023; G09G 3/20
See application file for complete search history.

(56) References Cited

U.S. PATENT DOCUMENTS

2014/0176486 A1* 6/2014 Lee ..................... G06F 3/04164
345/174
2019/0036208 A1* 1/2019 Yamagishi ......... G06K 7/10297

FOREIGN PATENT DOCUMENTS

JP 6238624 B2 7/2013

* cited by examiner

*Primary Examiner* — Md Saiful A Siddiqui
(74) *Attorney, Agent, or Firm* — ScienBiziP, P.C.

(57) ABSTRACT

A position detecting device including an antenna function includes a plurality of electrodes including a plurality of shared electrodes separated by spaces, a position detection circuit configured to detect a position by energizing the plurality of electrodes and using electric fields generated between the plurality of electrodes, an antenna circuit configured to perform wireless communication by energizing the plurality of shared electrodes and using magnetic fields generated in the spaces, and a switch connected to at least the plurality of shared electrodes among the plurality of electrodes, the position detection circuit, and the antenna circuit, the switch being configured to selectively connect either the position detection circuit or the antenna circuit to the plurality of shared electrodes.

7 Claims, 29 Drawing Sheets

POSITION DETECTING DEVICE INCLUDING ANTENNA FUNCTION AND DISPLAY DEVICE

TECHNICAL FIELD

The disclosure relates to a position detecting device including an antenna function, and a display device.

BACKGROUND ART

The display device described in PTL 1 below is a known example of a conventional display device used in a merchandise sales data processing device. The display device described in PTL 1 is a touch panel-type liquid crystal display device having an information input function based on a touch operation performed by a shopper, and includes a display screen. The display screen includes a liquid crystal display panel, a touch panel as an input indication unit provided on a front side of the liquid crystal display panel, and an antenna used for communication with an IC card as a wireless communication medium.

CITATION LIST

Patent Literature

PTL 1: JP 5238624 B2

Technical Problem

In the display device described in PTL 1, the antenna is bonded to a rear side of the touch panel, which is closer to the front side of the display device than the liquid crystal display panel. In other words, the antenna is created as a dedicated component and configured to be externally mounted to the touch panel. This configuration creates a problem in that the display device initially includes a large number of components. In addition, parasitic capacitance occurs between the antenna and the touch panel. This parasitic capacitance reduces antenna sensitivity and touch sensitivity, which is a problem.

SUMMARY

The disclosure has been made based on the circumstances described above, and an object of the disclosure is to reduce the number of components and suppress parasitic capacitance.

Solution to Problem (1) One embodiment of the disclosure is a position detecting device including an antenna function, including a plurality of electrodes including a plurality of shared electrodes separated by spaces, a position detection circuit configured to detect a position by energizing the plurality of electrodes and using electric fields generated between the plurality of electrodes, an antenna circuit configured to perform wireless communication by energizing the plurality of shared electrodes and using magnetic fields generated in the spaces, and a switch connected to at least the plurality of shared electrodes among the plurality of electrodes, the position detection circuit, and the antenna circuit, the switch being configured to selectively connect either the position detection circuit or the antenna circuit to the plurality of shared electrodes.

(2) One embodiment of the disclosure is a position detecting device including an antenna function having the configuration according to (1), in which the plurality of electrodes include a plurality of first electrodes extending in a first direction, and a plurality of second electrodes disposed overlapping the plurality of first electrodes and extending in a second direction intersecting the first direction, the plurality of shared electrodes include a plurality of first shared electrodes included in the plurality of first electrodes and separated by first spaces, and a plurality of second shared electrodes included in the plurality of second electrodes and separated by second spaces that at least partially overlap the first spaces, and the switch includes a first switch connected to at least the plurality of first shared electrodes among the plurality of first electrodes, the position detection circuit, and the antenna circuit, the first switch being configured to selectively connect either the position detection circuit or the antenna circuit to the plurality of first shared electrodes, and a second switch connected to at least the plurality of second shared electrodes among the plurality of second electrodes, the position detection circuit, and the antenna circuit, the second switch being configured to selectively connect either the position detection circuit or the antenna circuit to the plurality of second shared electrodes.

(3) One embodiment of the disclosure is a position detecting device including an antenna function having the configuration according to (1) or (2), in which the antenna circuit includes at least an external connection wiring line configured to connect two shared electrodes included in the plurality of shared electrodes to an external antenna drive unit, a plurality of short-circuit wiring lines configured to short-circuit the two shared electrodes included in the plurality of shared electrodes and separated by the spaces, and a short-circuit changeover switch configured to switch short-circuiting between the two shared electrodes by using some of the short-circuit wiring lines included in the plurality of short-circuit wiring lines, in which, when the number of the plurality of shared electrodes is 2n, two external connection wiring lines and (n−1) short-circuit wiring lines are connectable to one end side of each of the plurality of shared electrodes and n short-circuit wiring lines are connectable to another end side of each of the plurality of shared electrodes.

(4) One embodiment of the disclosure is a position detecting device including an antenna function having the configuration according to any one of (1) to (3), in which the plurality of shared electrodes are arranged such that the plurality of electrodes are present in the spaces.

(5) One embodiment of the disclosure is a position detecting device including an antenna function having the configuration according to any one of (1) to (4), in which the switch is arranged to be selectively connected to the plurality of shared electrodes among the plurality of electrodes.

(6) One embodiment of the disclosure is a position detecting device including an antenna function having the configuration according to any one of (1) to (4), in which switch is arranged to be individually connected to all of the plurality of electrodes.

(7) One embodiment of the disclosure is a position detecting device including an antenna function having the configuration according to (6), in which the antenna circuit includes at least an external connection wiring line configured to connect two shared electrodes included in the plurality of shared electrodes to an external antenna drive unit, and a short-circuit wiring line configured to short-circuit the two shared electrodes included in the plurality of shared electrodes and separated by the spaces, and the position detecting device including an antenna function further includes a first substrate provided with at least the switch, and a second substrate mounted to the first substrate and provided with at least the external connection wiring line and the short-circuit wiring line, the external connection wiring line and the short-circuit wiring line being selectively connected to a particular switch depending on a mounting position at which the second substrate is mounted to the first substrate.

(8) One embodiment of the disclosure is a position detecting device including an antenna function having the configuration according to (7), in which the antenna circuit includes at least a plurality of the short-circuit wiring lines, and a short-circuit changeover switch that is individually connected to all of the plurality of electrodes and connected to some of the plurality of short-circuit wiring lines, the short-circuit changeover switch being configured to switch conduction/non-conduction between the plurality of electrodes and the plurality of short-circuit wiring lines, the position detecting device including an antenna function further includes a third substrate provided with the plurality of short-circuit wiring lines and not provided with the external connection wiring line, the third substrate being mounted to the first substrate on a side opposite to the second substrate, and, when the number of the plurality of shared electrodes is 2n, two external connection wiring lines and (n−1) short-circuit wiring lines are provided on the second substrate, and n short-circuit wiring lines are provided on the third substrate.

(9) One embodiment of the disclosure is a position detecting device including an antenna function having the configuration according to (6), in which the antenna circuit includes at least an external connection wiring line configured to connect two shared electrodes included in the plurality of shared electrodes to an external antenna drive unit, a short-circuit wiring line configured to short-circuit the two shared electrodes included in the plurality of shared electrodes and separated by the spaces, and a plurality of switch connection portions connected to a plurality of the switches individually connected to the plurality of electrodes, the position detecting device including an antenna function further includes a first substrate provided with at least the plurality of switches, and a second substrate provided with at least the external connection wiring line, the short-circuit wiring line, and the plurality of switch connection portions, the second substrate being mounted to the first substrate, and the external connection wiring line and the short-circuit wiring line are selectively connected to the plurality of switch connection portions.

(10) One embodiment of the disclosure is a position detecting device including an antenna function having the configuration according to (9), in which the antenna circuit includes a plurality of external connection wiring line switches connected to each of the plurality of switch connection portions and the external connection wiring line, the plurality of external connection wiring line switches being configured to selectively connect one of the plurality of switch connection portions to the external connection wiring line, and a plurality of short-circuit wiring line switches connected to each of the plurality of switch connection portions and the short-circuit wiring line, the plurality of short-circuit wiring line switches being configured to selectively connect one of the plurality of switch connection portions to the short-circuit wiring line, and the plurality of external connection wiring line switches and the plurality of short-circuit wiring line switches are provided on the second substrate.

(11) One embodiment of the disclosure is a position detecting device including an antenna function having the configuration according to (9) or (10), in which the antenna circuit includes at least a plurality of the short-circuit wiring lines, a short-circuit changeover switch individually connected to all of the plurality of electrodes and connected to some of the plurality of short-circuit wiring lines, the short-circuit changeover switch being configured to switch conduction/non-conduction between the plurality of electrodes and the plurality of short-circuit wiring lines, and a plurality of second switch connection portions connected to a plurality of the short-circuit changeover switches, the position detecting device including an antenna function further includes a third substrate provided with the plurality of short-circuit wiring lines and not provided with the external connection wiring line, the third substrate being mounted to the first substrate on a side opposite to the second substrate, and, when the number of the plurality of shared electrodes is 2n, two external connection wiring lines and (n−1) short-circuit wiring lines are provided on the second substrate, n short-circuit wiring lines and the plurality of second switch connection portions are provided on the third substrate, and the plurality of short-circuit wiring lines are selectively connected to the plurality of second switch connection portions.

(12) One embodiment of the disclosure is a position detecting device including an antenna function having the configuration according to (11), in which the antenna circuit includes a plurality of second short-circuit wiring line switches connected to the plurality of second switch connection portions and the plurality of short-circuit wiring lines, the plurality of second short-circuit wiring line switches being configured to selectively connect one of the plurality of second switch connection portions to the plurality of short-circuit wiring lines, and the plurality of second short-circuit wiring line switches are provided on the third substrate.

(13) One embodiment of the disclosure is a display device including the position detecting device including an antenna function according to any one of (1) to (12), and a display panel layered on the position detecting device including an antenna function, the display panel including a display region in which an image is displayable, and a non-display region surrounding the display region, in which the plurality of electrodes are disposed at positions overlapping the display region.

Advantageous Effects of Disclosure

According to the disclosure, the number of components can be reduced and parasitic capacitance can be suppressed.

DESCRIPTION OF EMBODIMENTS

First Embodiment

A first embodiment of the disclosure will be described with reference to FIGS. 1 to 8. The present embodiment describes an exemplary liquid crystal display device (display device) 10 having a position detection function and an antenna function (wireless communication function) in addition to an image display function. Note that an X axis, a Y axis, and a Z axis are illustrated in a part of each drawing, and each axial direction is illustrated to be the direction illustrated in each drawing.

Figure 1:
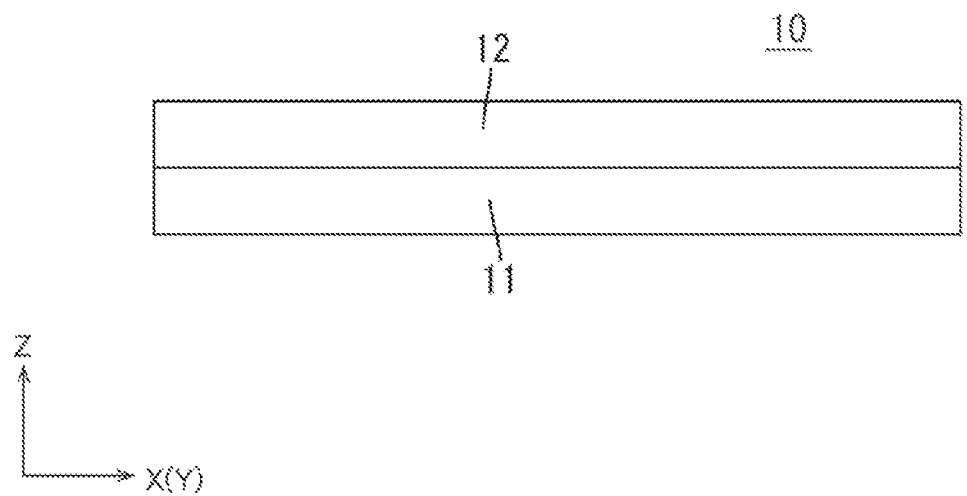
FIG. 1 is a side view of a liquid crystal display device according to a first embodiment of the disclosure.
Figure 2:
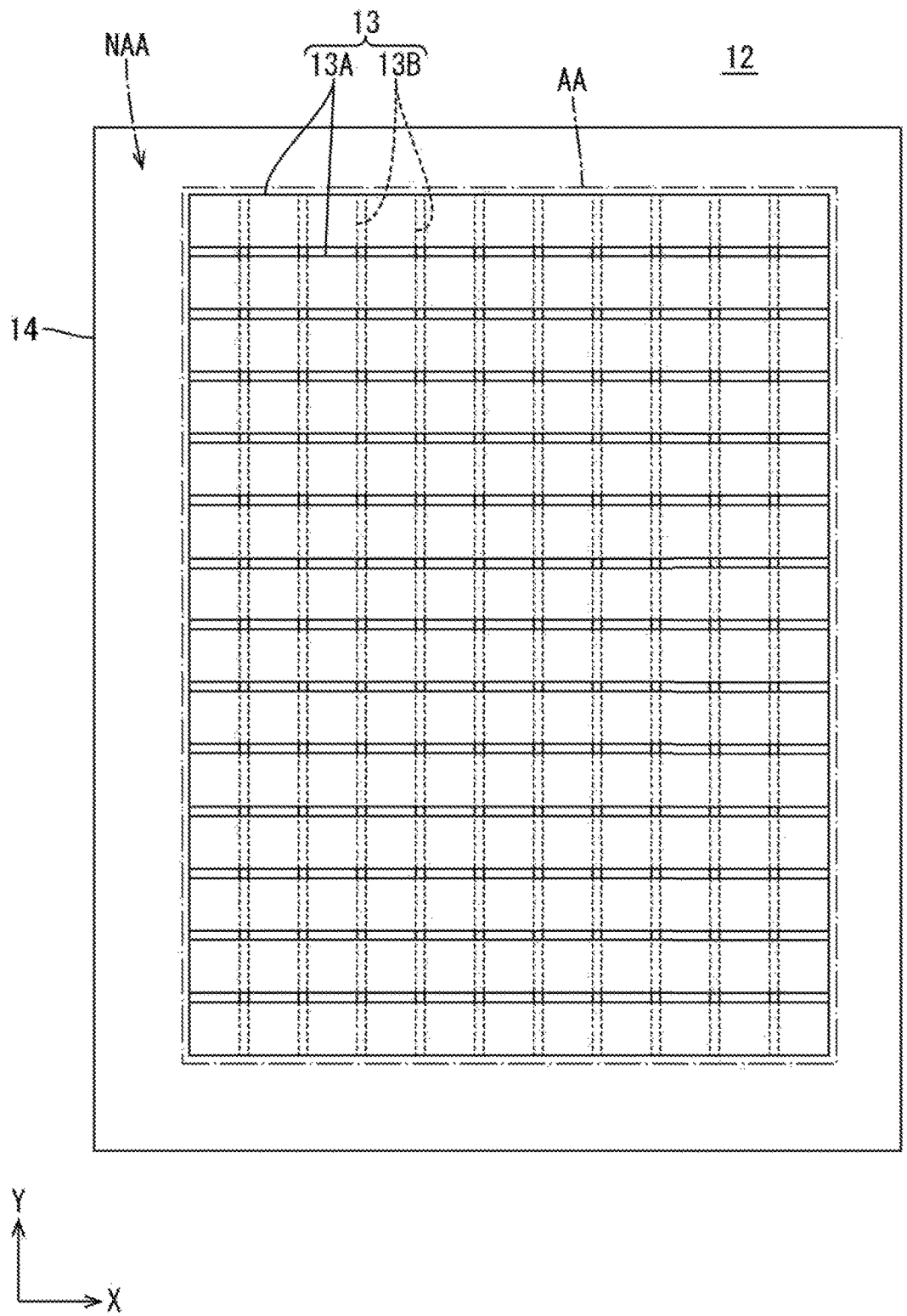
FIG. 2 is a plan view of a touch panel constituting a liquid crystal display device.

The liquid crystal display device 10 according to the present embodiment is to be used in various electronic devices such as point of sale (POS) terminals, information displays, and electronic blackboards. As illustrated in FIG. 1, the liquid crystal display device 10 includes a liquid crystal panel (display panel) 11 configured to display an image, a touch panel (position detecting device including antenna function) 12 arranged facing a front side with respect to the liquid crystal panel 11, and a backlight device (illumination device) as an external light source disposed facing a rear side with respect to the liquid crystal panel 11 and configured to irradiate light toward the liquid crystal panel 11. It is assumed that the liquid crystal panel 11 and the backlight device constituting the liquid crystal display device 10 have a display function and that the touch panel 12 has a position detection function and an antenna function. Note that the liquid crystal panel 11 and the backlight device have a known configuration. A display surface of the liquid crystal panel 11 is divided into a display region AA in which an image is displayed and a non-display region NAA in which an image is not displayed. The non-display region NAA has a frame shape that surrounds the display region AA. In FIG. 2, the display region AA is the region surrounded by a double dot chain line, and the region outside the display region AA is the non-display region NAA.

As illustrated in FIG. 2, the touch panel 12 has a generally long rectangular shape, with the short side direction coinciding with the X-axis direction in the drawings and the long side direction coinciding with the Y-axis direction in the drawings. The touch panel 12 includes at least a plurality of electrodes 13 that form a touch panel pattern used for detecting the position of input by a user, and an electrode substrate (first substrate) 14 provided with the plurality of electrodes 13. The touch panel pattern according to the present embodiment is a so-called projection-type capacitive pattern and employs mutual-capacitance detection as a detection type. The plurality of electrodes 13 are disposed at positions overlapping the display region AA of the liquid crystal panel 11. Accordingly, a touch region (position detection region) in which an input position on the touch panel 12 can be detected is substantially identical to the display region AA of the liquid crystal panel 11, and a non-touch region (non-position detection region) in which the input position cannot be detected is substantially identical to the non-display region NAA.

Each of the plurality of electrodes 13 is formed from a mesh metal film having a reticulate shape (mesh shape). The mesh metal film is formed by, for example, forming a solid metal film having light-blocking properties on the electrode substrate 14 and then etching the solid metal film to pattern a large fine mesh (mesh, openings). As a result, light transmittance of the touch panel 12 can be guaranteed to a certain extent because light passes through the mesh. As illustrated in FIG. 2, the plurality of electrodes 13 includes first electrodes 13A that extend in the X-axis direction (first direction) and are formed as horizontal strips, and second electrodes 13B that extend in the Y-axis direction (second direction) orthogonal to (intersecting) the X-axis direction and are formed as vertical strips. The length dimension of each first electrode 13A is approximately the same as the short side dimension of the display region AA. A plurality of the first electrodes 13A are disposed side by side at approximately equal intervals in the Y-axis direction. The length dimension of each second electrode 13B is approximately the same as the long side dimension of the display region AA. A plurality of the second electrodes 13B are disposed side by side at approximately equal intervals in the X-axis direction. The first electrode 13A and the second electrode 13B have the same width dimension, and the intervals between first electrodes 13A and second electrodes 13B are the same. One first electrode 13A is arranged to overlap all of the second electrodes 13B in the display region AA. Similarly, one second electrode 13B is arranged to overlap all of the first electrodes 13A in the display region AA. The first electrode 13A constitutes a drive electrode (transmission electrode) that receives input of a touch signal (position detection signal) on the touch panel pattern. The second electrode 13B constitutes a detection electrode (reception electrode). At the detection electrode, an electric field (electrostatic capacitance) is generated between the second electrode 13B and the first electrode 13A, which is the drive electrode to which the touch signal has been input. With this touch panel pattern, the presence of a touch operation (position input) can be detected based on a difference in electrostatic capacitance caused by the presence of an object (such as a user's finger) that blocks the electric field formed between the first electrode 13A, which is the drive electrode, and the second electrode 13B, which is the detection electrode. Further, the input position of this touch operation can be detected.

Figure 3:
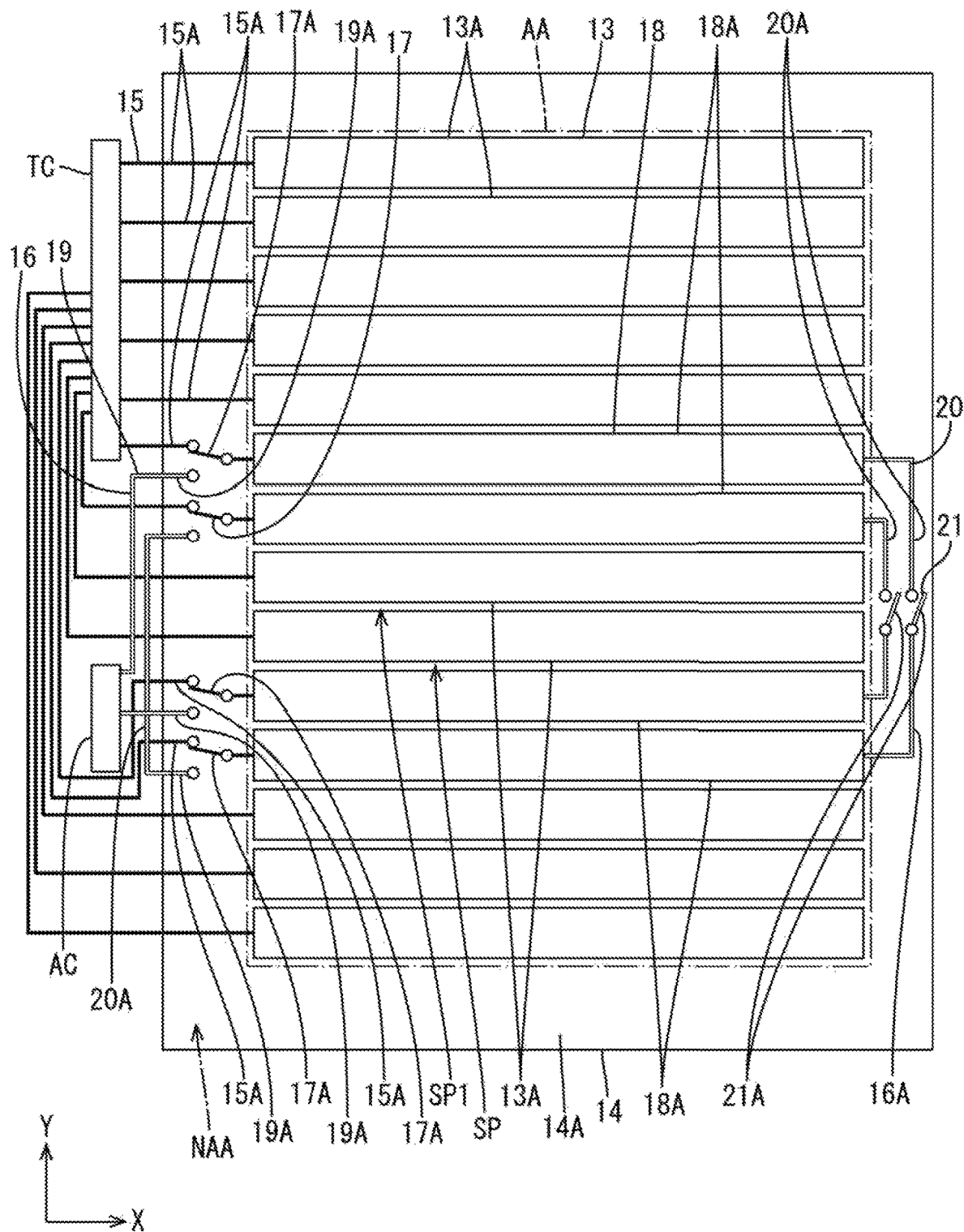
FIG. 3 is a plan view of a first electrode substrate constituting a touch panel.
Figure 4:
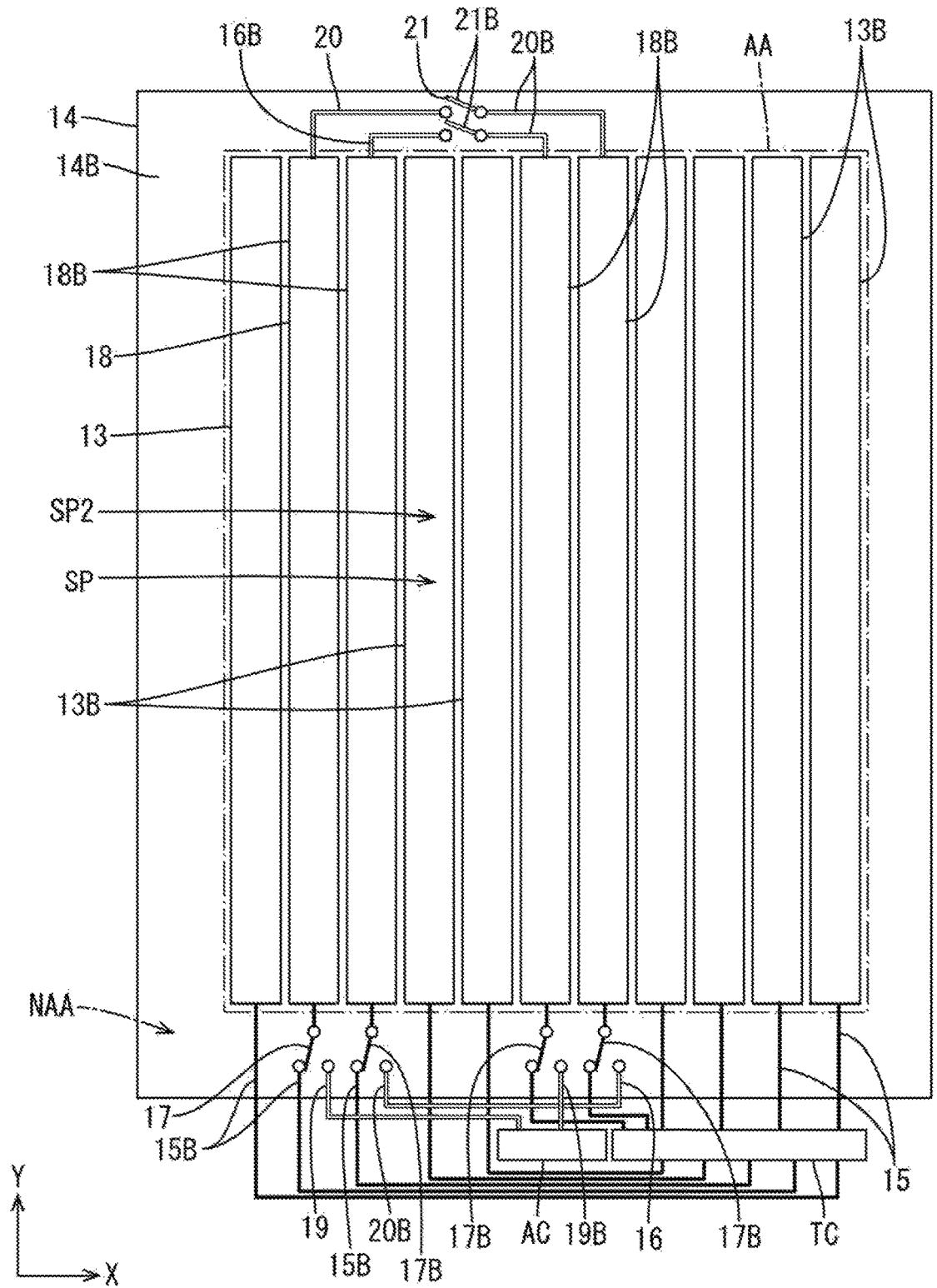
FIG. 4 is a plan view of a second electrode substrate constituting a touch panel.

The electrode substrate 14 is made of a synthetic resin material such as polyethylene terephthalate (PET), has excellent light-transmitting properties and is substantially transparent. As illustrated in FIGS. 3 and 4, the electrode substrate 14 includes a first electrode substrate 14A provided with a plurality of first electrodes 13A, and a second electrode substrate 14B provided with a plurality of the second electrodes 13B. FIG. 3 is a plan view of the first electrode substrate 14A and FIG. 4 is a plan view of the second electrode substrate 14B. The planar shape and size of the first electrode substrate 14A and the second electrode substrate 14B are substantially the same as the planar shape and size of the touch panel 12. The first electrode substrate 14A is disposed overlapping a front side with respect to the second electrode substrate 14B. Thus, the first electrode substrate 14A, which is an insulator, is interposed between the first electrodes 13A and the second electrodes 13B that overlap each other to prevent short-circuiting between the electrodes 13A and 13B.

As illustrated in FIGS. 3 and 4, the electrode substrate 14 includes a position detection circuit 15 used to detect a position by energizing the plurality of electrodes 13, an antenna circuit 16 used to perform wireless communication by energizing some of the plurality of electrodes 13 (a shared electrode 18 described below), and a switch 17 used for selectively connecting either the position detection circuit 15 or the antenna circuit 16 to some of the plurality of electrodes 13. The position detection circuit 15 is connected to an external touch controller (position detection drive unit) TC via an external connection member mounted on the electrode substrate 14. For example, a flexible substrate is used as the external connection member. The touch controller TC can supply pulses related to touch signals to the position detection circuit 15 via the external connection member at a low frequency of, for example, approximately 100 kHz. The position detection circuit 15 includes a first position detection circuit 15A provided on the first electrode substrate 14A and a second position detection circuit 15B provided on the second electrode substrate 14B. The antenna circuit 16 is connected to an external antenna controller (antenna drive unit, NFC controller) AC via an external connection member mounted to the electrode substrate 14. The antenna controller AC can supply pulses related to antenna signals to the position detection circuit 15 via the external connection member at a high frequency of, for example, approximately 14 MHz (13.56 MHz, etc.). The antenna circuit 16 includes a first antenna circuit 16A provided on the first electrode substrate 14A and a second antenna circuit 16B provided on the second electrode substrate 14B.

As illustrated in FIGS. 3 and 4, the switch 17 is connected to some of the plurality of electrodes 13, the position detection circuit 15, and the antenna circuit 16. In the present embodiment, the number of installed switches 17 is less than the number of installed electrodes 13. In other words, the switch 17 is arranged to be selectively connected to the shared electrode 18, which is made up of specific electrodes 13 included in the plurality of electrodes 13. The shared electrode 18 is shared among the position detection circuit 15 and the antenna circuit 16 and is selectively energized by either the position detection circuit 15 or the antenna circuit 16 depending on the switching state of the switch 17. Among the plurality of electrodes 13, electrodes 13 that are not shared (non-shared electrodes) are not connected to the switch 17 and are directly connected to the position detection circuit 15. The switch 17 includes a first switch 17A provided on the first electrode substrate 14A and a second switch 17B provided on the second electrode substrate 14B. Note that the switch 17 may be either a mechanical switch or an electronic switch provided that the switch 17 can transmit each pulse supplied to the position detection circuit 15 and the antenna circuit 16. Further, the switch 17 is connected to a switch controller such that the switching state of the switch 17 is mechanically or electronically controlled by the switch controller.

The shared electrode 18 included in the plurality of electrodes 13 and connected to the switch 17 will now be described in detail. As illustrated in FIGS. 3 and 4, a plurality of the shared electrodes 18 are disposed with spaces SP between the shared electrodes 18. In the present embodiment, the number of shared electrodes 18 is an even number. The plurality of shared electrodes 18 are connected to the antenna circuit 16 via a plurality of the switches 17. When the plurality of shared electrodes 18 are energized, magnetic fields are generated in the spaces SP between the shared electrodes 18 based on the pulse output from the antenna controller AC. The magnetic fields generated in the spaces SP can be used to perform near field wireless communication such as Near Field Communication (NFC) between an external device and the touch panel 12 according to the present embodiment. Specific examples of the external device include an IC card and a smartphone including a device-side antenna. Near-field communication can be achieved when a user brings an external device such as an IC card or a smartphone close to the spaces SP between the shared electrodes 18 based on an image displayed in the display region AA of the liquid crystal panel 11.

As illustrated in FIGS. 3 and 4, the shared electrode 18 includes first shared electrodes 18A provided on the first electrode substrate 14A and second shared electrodes 18B provided on the second electrode substrate 14B. The spaces SP between the plurality of shared electrodes 18 include first spaces SP1 between the plurality of first shared electrodes 18A and second spaces SP2 between the plurality of second shared electrodes 18B. Specifically, of the plurality of first electrodes 13A, four first electrodes, namely, the sixth first electrode 13A, the seventh first electrode 13A, the tenth first electrode 13A, and the eleventh first electrode 13A counting from the upper edge in FIG. 3 are the first shared electrodes 18A. The first space SP1 is present between the seventh first electrode 13A and the tenth first electrode 13A from the upper edge in FIG. 3 and is arranged overlapping two first electrodes 13A (the eighth first electrode 13A and the ninth first electrode 13A). The first space SP1 has a long, horizontal belt shape and a width dimension that is slightly larger than sum of the width dimensions of two first electrodes 13A. Of the plurality of second electrodes 13B, four second electrodes, namely, the second second electrode 13B, the third second electrode 13B, the sixth second electrode 13B, and the seventh second electrode 13B counting from the left edge in FIG. 4 are the second shared electrodes 18B. The second space SP2 is present between the third second electrode 13B and the sixth second electrode 13B from the left edge in FIG. 4 and is arranged overlapping two second electrodes 13B (the fourth second electrode 13B and the fifth second electrode 13B). The second space SP2 has a long, vertical belt shape and a width dimension that is slightly larger than the sum of the width dimensions of two second electrodes 13B. In addition, the first space SP1 and the second space SP2 are arranged so as to partially overlap each other. An overlapping space OSP between the first space SP1 and the second space SP2 has a substantially square shape in plan view. The dimension of one side of the overlapping space OSP is equal to the width dimension of the first space SP1 and the second space SP2 (see FIG. 8). The number of installed first switches 17A that are individually connected to the first shared electrodes 18A is equal to the number of installed first shared electrodes 18A (four). Similarly, the number of installed second switches 17B that are individually connected to the second shared electrodes 18B is equal to the number of installed second shared electrodes 18B (four).

As illustrated in FIGS. 3 and 4, the antenna circuit 16 includes two external connection wiring lines 19 that connect two shared electrodes 18 of the plurality of shared electrodes 18 to the external antenna controller AC, short-circuit wiring lines 20 configured to short-circuit two shared electrodes 18 of the plurality of shared electrodes 18 that are separated by the spaces SP, and short-circuit changeover switches 21 that switch between short-circuiting two shared electrodes 18 using some of a plurality of the short-circuit wiring lines 19. The two external connection wiring lines 19 are disposed on the same side with respect to the two shared electrodes 18 to be connected. In contrast, three short-circuit wiring lines 20 are disposed in a dispersed manner on one end sides and another end sides of three pairs of two shared electrodes 18 that are to be connected and sandwich the space SP. Of the three short-circuit wiring lines 20, one short-circuit wiring line 20 is disposed on the same side of the shared electrode 18 as the two external connection wiring lines 19 and is connected to the shared electrode 18 via the switch 17. Of the three short-circuit wiring lines 20, two short-circuit wiring lines 20 are disposed on sides the shared electrodes 18 opposite to the two external connection wiring lines 19 and are directly connected to the shared electrode 18 without the switch 17. The short-circuit changeover switches 21 are provided connected to each of the two short-circuit wiring lines 20 that are directly connected to the shared electrodes 18. When the switching state of the short-circuit changeover switch 21 is "OFF," the short-circuit wiring line 20 is non-conductive. Thus, the two shared electrodes 18 connected to the short-circuit wiring line 20 are not short-circuited. On the other hand, when the switching state of the short-circuit switch 21 is "ON," the short-circuit wiring line 20 is conductive, and hence the two shared electrodes 18 connected to the short-circuit wiring line 20 are short-circuited. The external connection wiring lines 19 include a first external connection wiring line 19A provided on the first electrode substrate 14A and a second external connection wiring line 19B provided on the second electrode substrate 14B. The short-circuit wiring lines 20 include a first short-circuit wiring line 20A provided on the first electrode substrate 14A and a second short-circuit wiring line 20B provided on the second electrode substrate 14B. The short-circuit changeover switches 21 include a first short-circuit changeover switch 21A provided on the first electrode substrate 14A and a second short-circuit changeover switch 21B provided on the second electrode substrate 14B. Note that the short-circuit changeover switch 21 may be either a mechanical switch or an electronic switch provided that the short-circuit changeover switch 21 can transmit the pulses provided to the antenna circuit 16. The short-circuit changeover switch 21 is connected to the switch controller described above such that the switching state of the short-circuit changeover switch 21 is mechanically or electronically controlled by the switch controller.

Specifically, as illustrated in FIG. 3, two first external connection wiring lines 19A are connected via the first switch 17A to left side end portions (one end sides) in FIG. 3 of the first shared electrodes 18A to be connected. Three first short-circuit wiring lines 20A include one first short-circuit wiring line 20A connected, via the first switch 17A, to left side end portions in FIG. 3 of the two first shared electrodes 18A to be connected, and two first short-circuit wiring lines 20A directly connected to right side end portions (other end sides) in FIG. 3 of the two first shared electrodes 18A to be connected. Two first external connection wiring lines 19A include one first external connection wiring line 19A connected, via the first switch 17A, to the first shared electrode 18A that is the sixth first electrode 18A counting from the upper edge in FIG. 3 among the plurality of first electrodes 13A, and one first external connection wiring line 19A connected, via the first switch 17A, to the first shared electrode 18A that is the tenth first electrode 13A from the upper edge in FIG. 3 among the plurality of first electrodes 13A. Of the three first short-circuit wiring lines 20A, the first short-circuit wiring line 20A disposed on the same side (left side in FIG. 3) as the first external connection wiring lines 19A in the X-axis direction is connected to, via the first switch 17A, the first shared electrode 18A that is the seventh first electrode 13A counting from the top edge in FIG. 3 and the first shared electrode 18A that is the eleventh first electrode 13A from the top edge in FIG. 3. Of the three first short-circuit wiring lines 20A, the two first short-circuit wiring lines 20A disposed on a side (right side in FIG. 3) opposite to the first external connection wiring lines 19A in the X-axis direction include a first short-circuit wiring line 20A directly connected to the first shared electrode 18A that is the sixth first electrode 13A counting from the upper edge in FIG. 3 and is connected to the first external connection wiring line 19A, and the first shared electrode 18A that is the eleventh first electrode 13A counting from the upper edge in FIG. 3, and a first short-circuit wiring line 20A directly connected to the first shared electrode 18A that is the seventh first electrode 13A counting from the upper edge in FIG. 3 and the first shared electrode 18A that is the tenth first electrode 13A counting from the upper edge in FIG. 3 and is connected to the first external connection wiring line 19A. The two first short-circuit wiring lines 20A directly connected to the first shared electrodes 18A to be connected are each partway provided with the first short-circuit changeover switch 21A.

As illustrated in FIG. 4, the two second external connection wiring lines 19B are connected, via the second switch 17B, to lower side end portions (one end sides) in FIG. 4 of the second shared electrodes 18B to be connected. Three second short-circuit wiring lines 20B include one second short-circuit wiring line 20B connected, via the second switch 17B, to lower side end portions in FIG. 4 of the two second shared electrodes 18B to be connected, and two second short-circuit wiring lines 20B directly connected to upper side end portions (other end sides) in FIG. 4 of the two second shared electrodes 18B to be connected. Two second external connection wiring lines 19B include a second external connection wiring line 19B connected, via the second switch 17B, to the second shared electrode 18B that is the second second electrode 13B counting from the left edge in FIG. 4, and a second external connection wiring line 19B connected, via the second switch 17B, to the second shared electrode 18B that is the sixth second electrode 13B from the left edge in FIG. 4. Of the three second short-circuit wiring lines 20B, the second short-circuit wiring line 20B disposed on the same side (lower side in FIG. 4) as the second external connection wiring lines 19B in the Y-axis direction is connected, via the second switch 17B, to the second shared electrode 18B that is the third second electrode 13B counting from the left edge in FIG. 4 and the second shared electrode 18B that is the seventh second electrode 13B counting from the left edge in FIG. 4. Of the three second short-circuit wiring lines 20B, two second short-circuit wiring lines 20B disposed on a side (upper side in FIG. 4) opposite to the second external connection wiring lines 19B in the Y-axis direction include a second short-circuit wiring line 20B directly connected to a second shared electrode 18B that is the second second electrode 13B counting from the left edge in FIG. 4 and is connected to the second external connection wiring line 19B and a second shared electrode 18B that is the seventh second electrode 13B counting from the left edge in FIG. 4, and a second short-circuit wiring line 20B directly connected to a second shared electrode 18B that is the third second electrode 13B counting from the left edge in FIG. 4 and a second shared electrode 18B that is the sixth second electrode 13B counting from the left edge in FIG. 4 and is connected to the second external connection wiring line 19B.

The two second short-circuit wiring lines 20B directly connected to the second shared electrodes 18B to be connected are each partway provided with the second short-circuit changeover switch 21B.

The present embodiment has the structure described above, and the actions thereof will now be described. With the liquid crystal display device 10 according to the present embodiment, the input position of a touch operation performed by a user on the touch panel 12 can be detected while an image is displayed in the display region AA of the liquid crystal panel 11, and near field wireless communication can be performed with an external device that the user has moved close to the touch panel 12. In order to achieve such a position detection function and an antenna function, the touch panel 12 is supplied with time-divided pulses from the external touch controller TC and the antenna controller AC.

Figure 5:
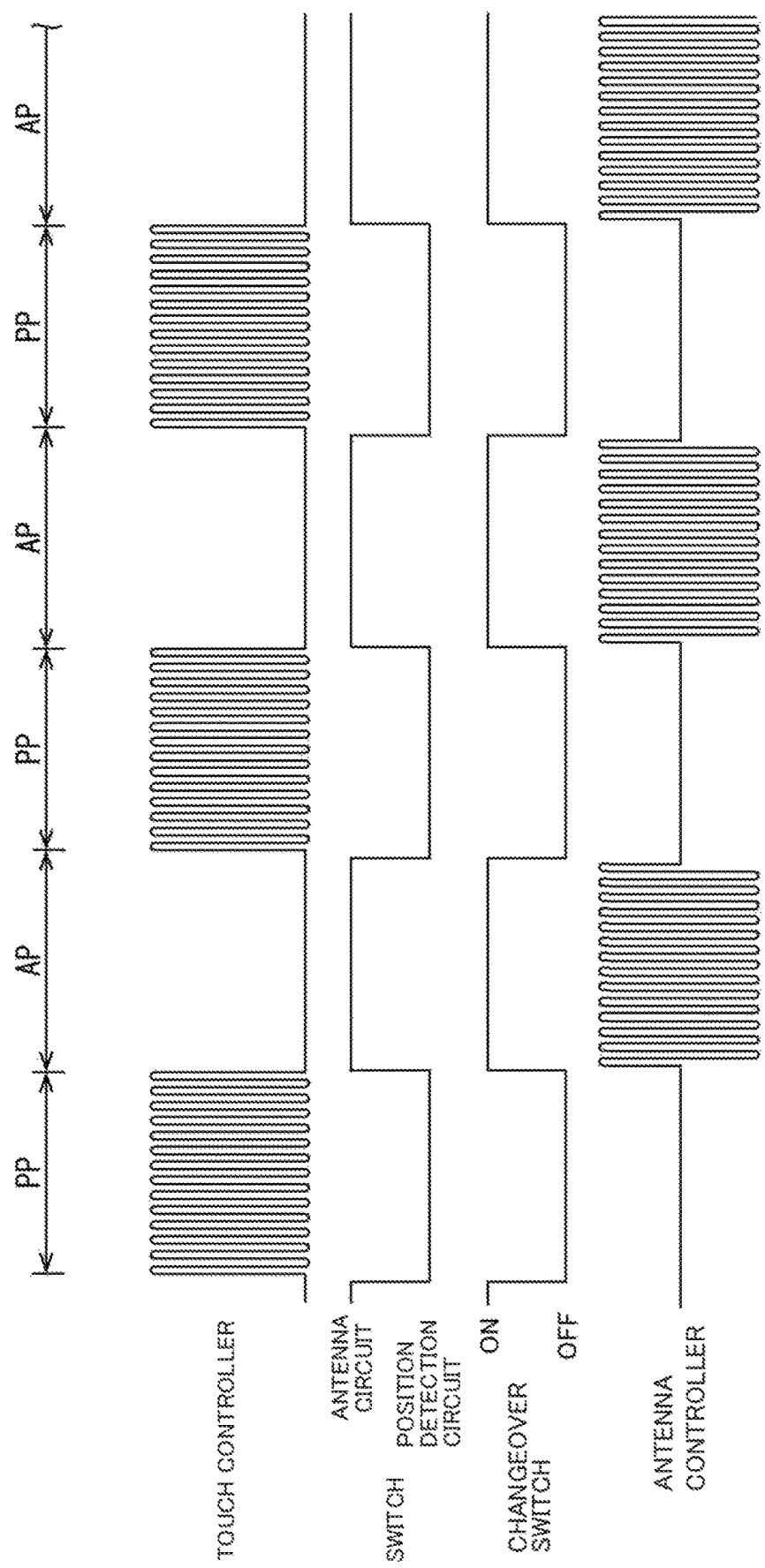
FIG. 5 is a timing chart showing drive of a touch controller, a switch, a short-circuit changeover switch, and an antenna controller.

Specifically, as illustrated in FIG. 5, the touch panel 12 is driven in a time-divided manner so as to alternate between two periods. These two periods are a position detection period PP in which a pulse is supplied from the touch controller TC to achieve the position detection function, and an antenna period AP in which a pulse is supplied from the antenna controller AC to achieve the antenna function. As illustrated in FIGS. 3 to 5, in the position detection period PP, the other end side of the switch 17, which has one end side connected to the shared electrode 18, is connected to the position detection circuit 15, and the short-circuit changeover switch 21 enters an OFF state. As a result, in the position detection period PP, the pulses output from the touch controller TC are supplied to each electrode 13, excluding the shared electrodes 18, via the position detection circuit 15, and to the shared electrodes 18 via the position detection circuit 15 and the switch 17. As a result, pulses are supplied to all of the electrodes 13 to achieve the position detection function. As illustrated in FIGS. 5 to 8, in the antenna period AP, the other end side of the switch 17, which has one end side connected to the shared electrode 18, is connected to the antenna circuit 16, and the short-circuit changeover switch 21 enters an ON state. As a result, in the antenna period AP, the pulses output from the antenna controller AC are supplied to the shared electrodes 18 via the external connection wiring lines 19 and the short-circuit wiring lines 20 constituting the antenna circuit 16, as well as the switches 17 and the short-circuit changeover switches 21. Note that in FIGS. 6 to 8, the electrodes 13 to be energized are illustrated with shading.

Figure 6:
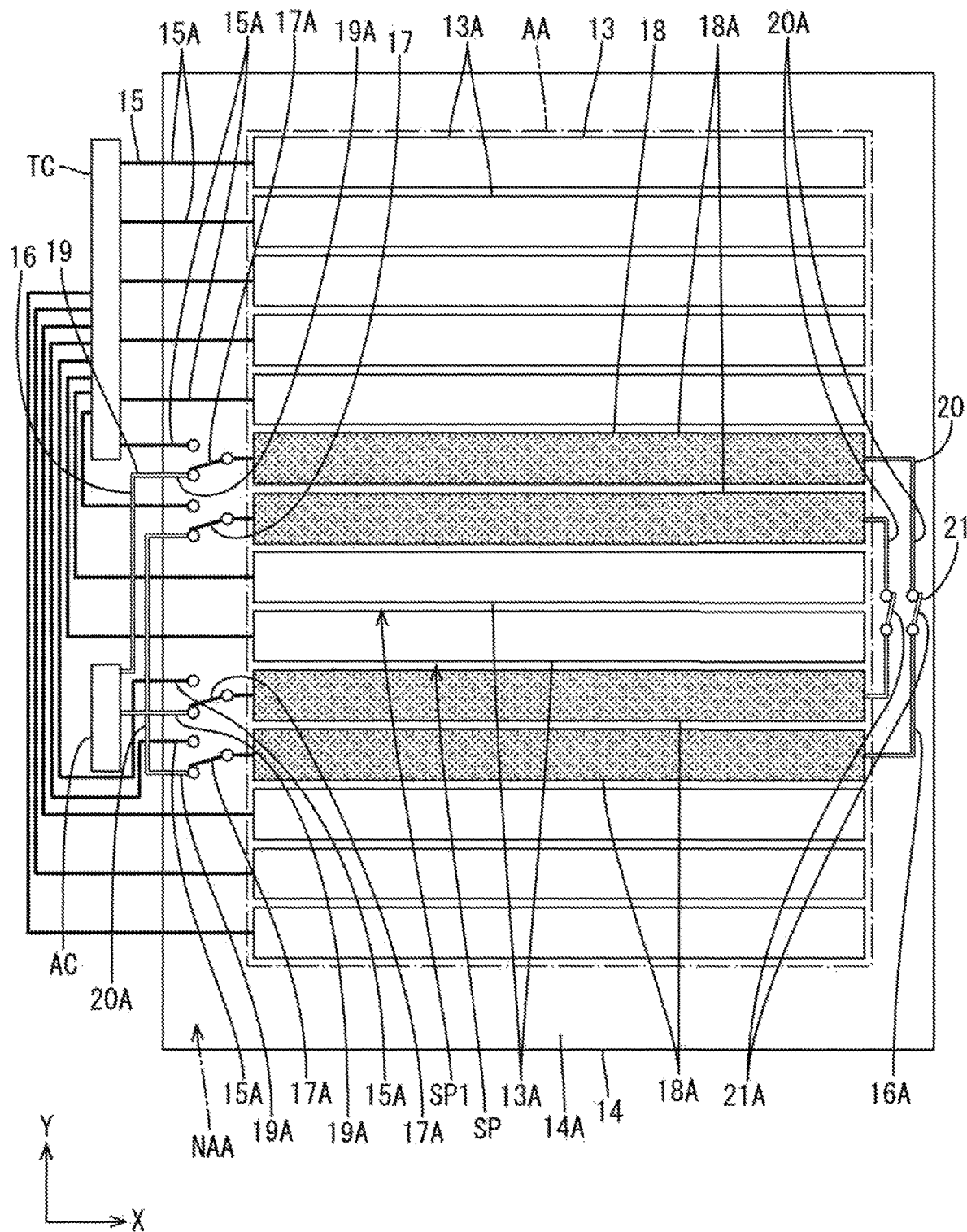
FIG. 6 is a plan view of a first electrode substrate during an antenna period.

The energized state of each electrode 13 during the antenna period AP and the operating state of each switch 17, 21 will be described in detail for each of the two electrode substrates 14A, 14B. First, as illustrated in FIG. 6, in the first electrode substrate 14A, the other end side of each first switch 17A is connected to the first antenna circuit 16A, and each of the first short-circuit changeover switches 21A is turned ON. In this state, two first shared electrodes 18A among the four first shared electrodes 18A are connected to the first external connection wiring lines 19A via the first switches 17A, and hence the two first shared electrodes 18A are supplied with the pulses output from the antenna controller AC. In addition, because the three first short-circuit wiring lines 20A connected to the four first shared electrodes 18A are made conductive by each of the first short-circuit switches 21A, the pulses output from the antenna controller AC are supplied to the four first shared electrodes 18A and the three first short-circuit wiring lines 20A via the first external connection wiring lines 19A. At this time, the pulses have a spiral transmission path which causes magnetic fields to be generated in the first spaces SP1 present between the four first shared electrodes 18A.

Figure 7:
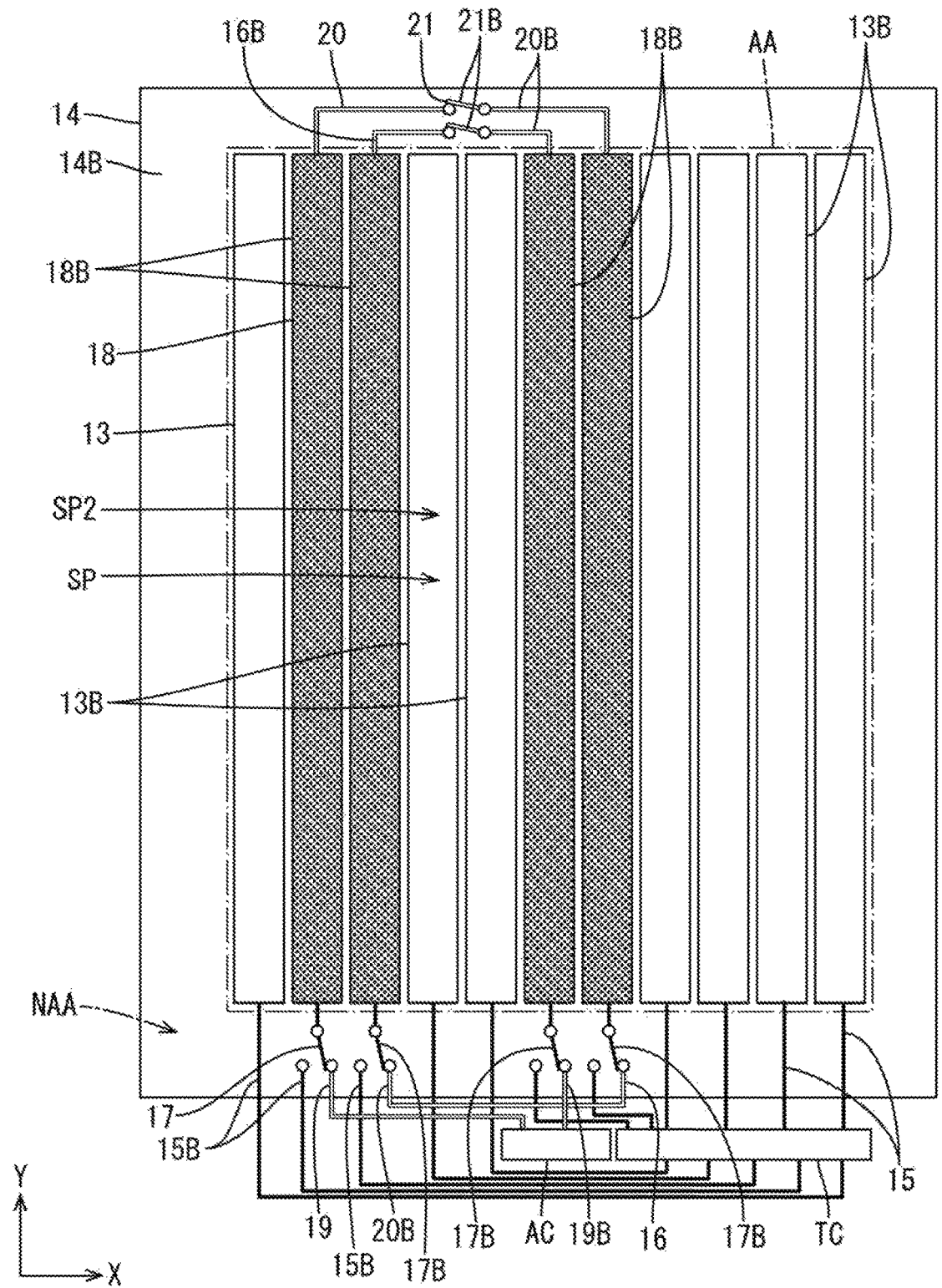
FIG. 7 is a plan view of a second electrode substrate during an antenna period.

Next, as illustrated in FIG. 7, in the second electrode substrate 14B, the other end side of each second switch 17B is connected to the second antenna circuit 16B, and each of the second short-circuit changeover switches 21B is turned ON. In this state, two second shared electrodes 18B among the four second shared electrodes 18B are connected to the second external connection wiring lines 19B via the second switches 17B, and hence the two second shared electrodes 18B are supplied with the pulses output from the antenna controller AC. In addition, because the three second short-circuit wiring lines 20B connected to the four second shared electrodes 18B are made conductive by each second short-circuit changeover switch 21B, the pulses output from the antenna controller AC are supplied to the four second shared electrodes 18B and the three second short-circuit wiring lines 20B via the second external connection wiring lines 19B. At this time, the pulses have a spiral transmission paths which causes magnetic fields to be generated in the second spaces SP2 present between the four second shared electrodes 18B.

Figure 8:
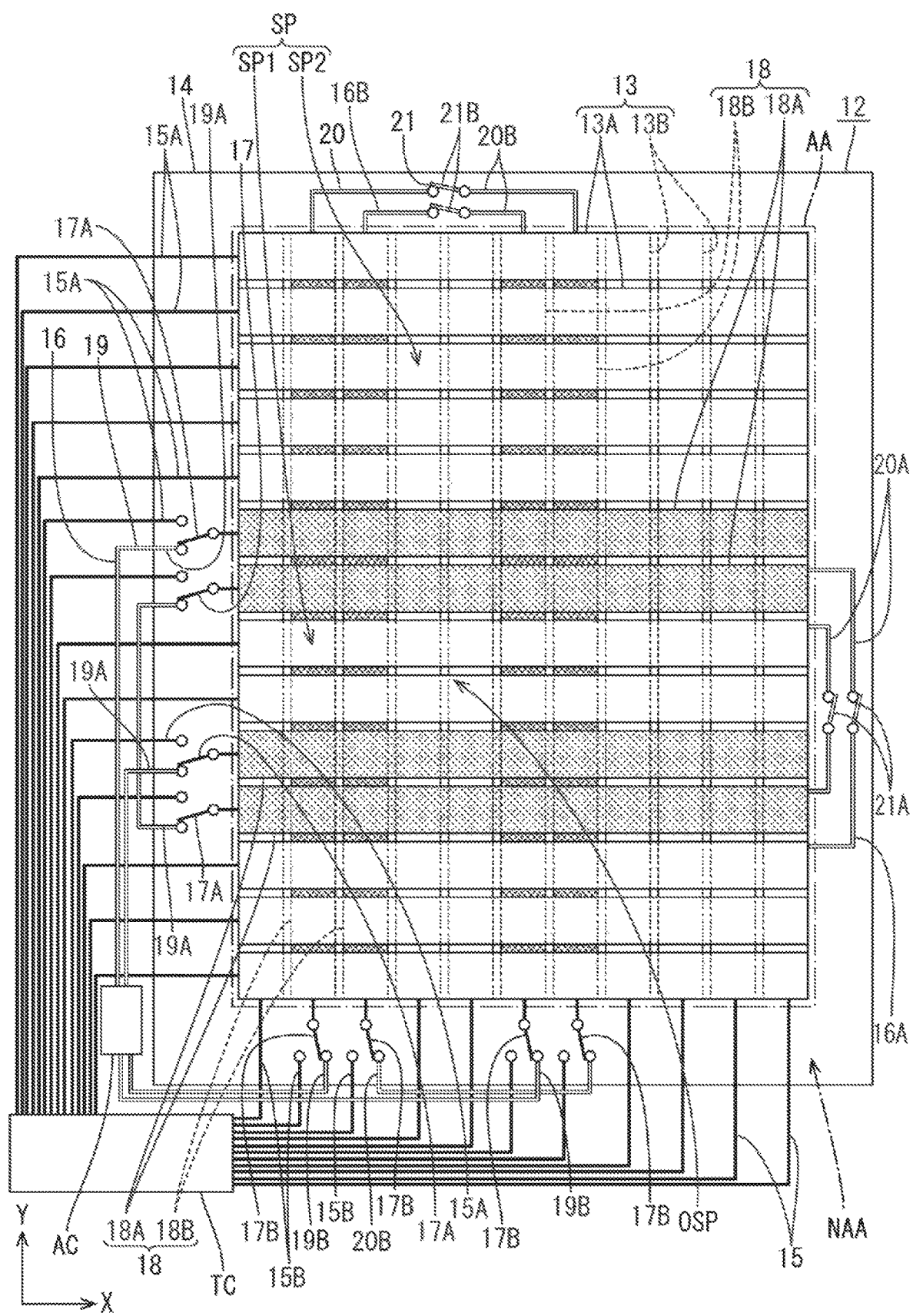
FIG. 8 is a plan view of a touch panel during an antenna period.

As illustrated in FIG. 8, energizing the first shared electrodes 18A provided on the first electrode substrate 14A by the first antenna circuit 16A and energizing the second shared electrodes 18B provided on the second electrode substrate 14B by the second antenna circuit 16B generate magnetic fields in the first spaces SP1 and the second spaces SP2. Then, if the pulses output from the antenna controller AC to the first antenna circuit 16A and the second antenna circuit 16B are synchronized such that the magnetic fields generated in the first spaces SP1 and the second spaces SP2 have the same orientation, the magnetic fields generated in the first spaces SP1 and the second spaces SP2 exhibit a strong interaction in the overlapping space OSP. As a result, a stronger magnetic field is generated in the overlapping space OSP than in a non-overlapping space, and this strong magnetic field can be used to stably perform near field wireless communication with an external device. Thus, excellent antenna performance can be obtained.

As described above, the touch panel (position detecting device including antenna function) 12 according to the present embodiment includes the plurality of electrodes 13 including the plurality of shared electrodes 18 separated by the spaces SP, the position detection circuit 15 configured to detect a position by energizing the plurality of electrodes 13 and using electric fields generated between the plurality of electrodes 13, the antenna circuit 16 configured to perform wireless communication by energizing the plurality of shared electrodes 18 and using magnetic fields generated in the spaces SP, and a switch 17 connected to at least the plurality of shared electrodes 18 among the plurality of electrodes 13, the position detection circuit 15, and the antenna circuit 16, the switch being configured to selectively connect either the position detection circuit 15 or the antenna circuit 16 to the plurality of shared electrodes 18.

According to such a configuration, when the plurality of electrodes 13 are energized by the position detection circuit 15, electric fields are generated between the electrodes 13, and those electric fields are used to detect a position. The plurality of electrodes 13 include the plurality of shared electrodes 18 with the spaces SP between the shared electrodes 18. When the plurality of shared electrodes 18 are energized by the antenna circuit 16, magnetic fields are generated in the spaces SP. These magnetic fields are used to perform wireless communication. In this manner, the shared electrodes 18 included in the plurality of electrodes 13 are shared by the position detection circuit 15 and the antenna circuit 16. Further, the switch 17 is connected to at least the plurality of shared electrodes 18, the position detection circuit 15, and the antenna circuit 16. With this switch 17, either the position detection circuit 15 or the antenna circuit 16 can be selectively connected to the plurality of shared electrodes 18. Therefore, compared to a conventional configuration where an antenna created as a dedicated component is externally mounted to a touch panel, the number of components can be reduced because dedicated antenna components are unnecessary. In addition, while the antenna circuit 16 is connected to the plurality of shared electrodes 18 by the switch 17 and the antenna function is active, the position detection circuit 15 is not connected to the plurality of shared electrodes 18 and the position detection function is not active. Thus, parasitic capacitance such as that in the prior art is avoided. As a result, both position detection sensitivity and antenna sensitivity are good.

In addition, the plurality of electrodes 13 include the plurality of first electrodes 13A extending in a first direction and the plurality of second electrodes 13B disposed overlapping the plurality of first electrodes 13A and extending in a second direction intersecting the first direction, the plurality of shared electrodes 18 include the plurality of first shared electrodes 18A included in the plurality of first electrodes 13A and separated by first spaces SP1, and the plurality of second shared electrodes 18B included in the plurality of second electrodes 13B and separated by second spaces SP2 that at least partially overlap the first spaces SP1, and the switch 17 includes the first switch 17A connected to at least the plurality of first shared electrodes 18A among the plurality of first electrodes 13A, the position detection circuit 15, and the antenna circuit 16, the first switch 17A being configured to selectively connect either the position detection circuit 15 or the antenna circuit 16 to the plurality of first shared electrodes 18A, and the second switch 17B connected to at least the plurality of second shared electrodes 18B among the plurality of second electrodes 13B, the position detection circuit 15, and the antenna circuit 16, the second switch 17B being configured to selectively connect either the position detection circuit 15 or the antenna circuit 16 to the plurality of second shared electrodes 18B. When the first switch 17A selectively connects the position detection circuit 15 to the plurality of first shared electrodes 18A and the second switch 17B selectively connects the position detection circuit 15 to the plurality of second shared electrodes 18B, electric fields are generated at each of the plurality of first electrodes 13A and second electrodes 13B. These electric fields are used to detect positions in a first direction and a second direction, respectively. On the other hand, when the first switch 17A selectively connects the antenna circuit 16 to the plurality of first shared electrodes 18A and the second switch 17B selectively connects the antenna circuit 16 to the plurality of second shared electrodes 18B, at least the plurality of first shared electrodes 18A and at least the plurality of second shared electrodes 18B are energized by the antenna circuit 16. In this state, magnetic fields are generated in the first spaces SP1 between the plurality of first shared electrodes 18A and the second spaces SP2 between the plurality of second shared electrodes 18. At this time, the magnetic fields generated by interaction are strengthened in the overlapping space OSP where the first space SP1 and the second space SP2 overlap. Thus, particularly good antenna sensitivity is obtained. Moreover, because each of the first shared electrodes 18A and second shared electrodes 18B are connected to the antenna circuit 16 to achieve the antenna function, compared to a conventional case where a single electrode 13 achieves the antenna function, resistance can be reduced and thus antenna sensitivity can be improved.

Further, the antenna circuit 16 includes at least the external connection wiring line 19 configured to connect two shared electrodes 18 included in the plurality of shared electrodes 18 to the external antenna controller (antenna drive unit) AC, the plurality of short-circuit wiring lines 20 configured to short-circuit the two shared electrodes 18 included in the plurality of shared electrodes 18 and separated by the spaces SP, and the short-circuit changeover switch 21 configured to switch short-circuiting between the two shared electrodes 18 by using some of the short-circuit wiring lines 20 included in the plurality of short-circuit wiring lines 20, in which, when the number of the plurality of shared electrodes 18 is 2n, two external connection wiring lines 19 and (n−1) short-circuit wiring lines 20 are connectable to one end side of each of the plurality of shared electrodes 18 and n short-circuit wiring lines 20 are connectable to another end side of each of the plurality of shared electrodes 18. With this configuration, the external connection wiring lines 19 constituting the antenna circuit 16 connect two shared electrodes 18 to the external antenna controller AC via the switch 17, and the two shared electrodes 18 having the spaces SP therebetween are short-circuited by the short-circuit wiring lines 20 constituting the antenna circuit 16 via the switch 17 and the short-circuit changeover switch 21. Specifically, in each of 2n, that is, an even number of shared electrodes 18, two external connection wiring lines 19 and (n−1) short-circuit wiring lines 20 can be connected to one end sides and n short-circuit wiring lines 20 can be connected to other end sides. Accordingly, when the antenna circuit 16 and the plurality of shared electrodes 18 are energized by the external antenna controller AC, magnetic fields are generated in the spaces SP between the plurality of shared electrodes 18. Further, because the two external connection wiring lines 19 are arranged in an aggregated manner on the same one end side with respect to the shared electrodes 18, it is possible to avoid a case where the two external connection wiring lines 19 are distributed on one end side and the other end side of the shared electrode 18, as in the case where the number of shared electrodes 18 is an odd number. Note that n is a natural number.

In addition, the plurality of shared electrodes 18 are arranged such that the electrodes 13 are present in the spaces SP. With this configuration, compared to a case where the electrode 13 is not present in the space SP between the plurality of shared electrodes 18, the space SP is widened by the amount of the space occupied by the electrode 13. As a result, a sufficient space SP where the magnetic field occurs can be ensured.

In addition, the switch 17 is arranged to be selectively connected to the plurality of shared electrodes 18 among the plurality of electrodes 13. With this configuration, compared to a case where the switches are disposed to be individually connected to the plurality of electrodes 13, the number of installed switches 17 can be reduced.

Further, the liquid crystal display device (display device) 10 according to the present embodiment includes the touch panel 12 described above, the liquid crystal panel (display panel) 11 layered on the touch panel 12 and including the display region AA in which an image is displayable and a non-display region NAA surrounding the display region, in which the plurality of electrodes 13 are disposed at positions overlapping the display region AA. With a liquid crystal display device 10 having such a configuration, the plurality of electrodes 13 arranged at positions overlapping the display region AA of the liquid crystal panel 11 are energized by the position detection circuit 15 to achieve the position detection function, and the plurality of shared electrodes 18 included in the plurality of electrodes 13 are energized by the antenna circuit 16 to achieve the antenna function. The user can input a position based on the image displayed in the display region AA and operate the external device for wireless communication. Thus, the liquid crystal display device 10 has excellent convenience.

Second Embodiment

A second embodiment of the disclosure will be described with reference to FIG. 9 to FIG. 16. The second embodiment deals with a configuration where an electrode 113 serving as a shared electrode 118 can be changed. Note that redundant descriptions of structures, actions, and effects similar to those of the first embodiment described above will be omitted.

Figure 9:
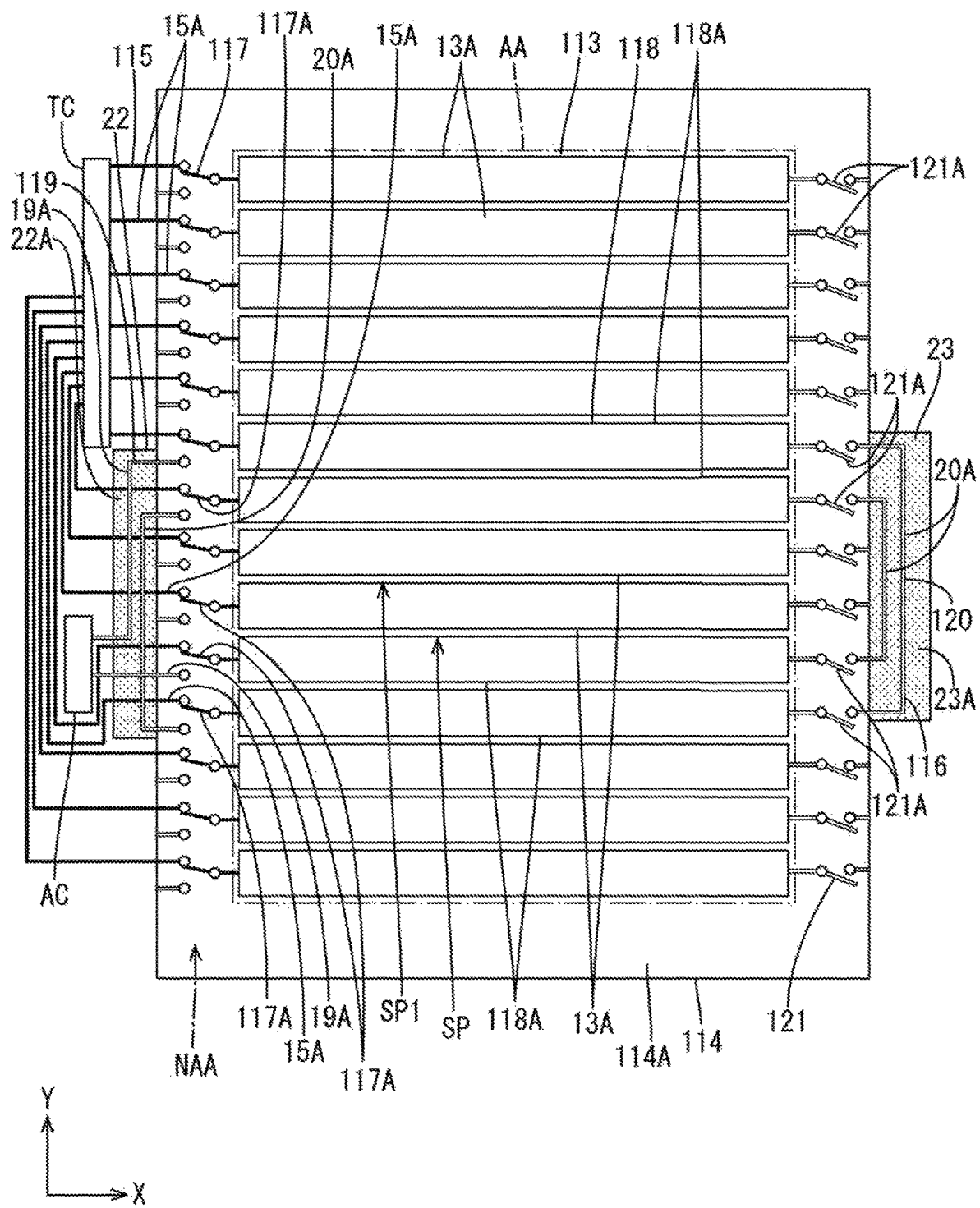
FIG. 9 is a plan view of a first electrode substrate constituting a touch panel according to a second embodiment of the disclosure.
Figure 10:
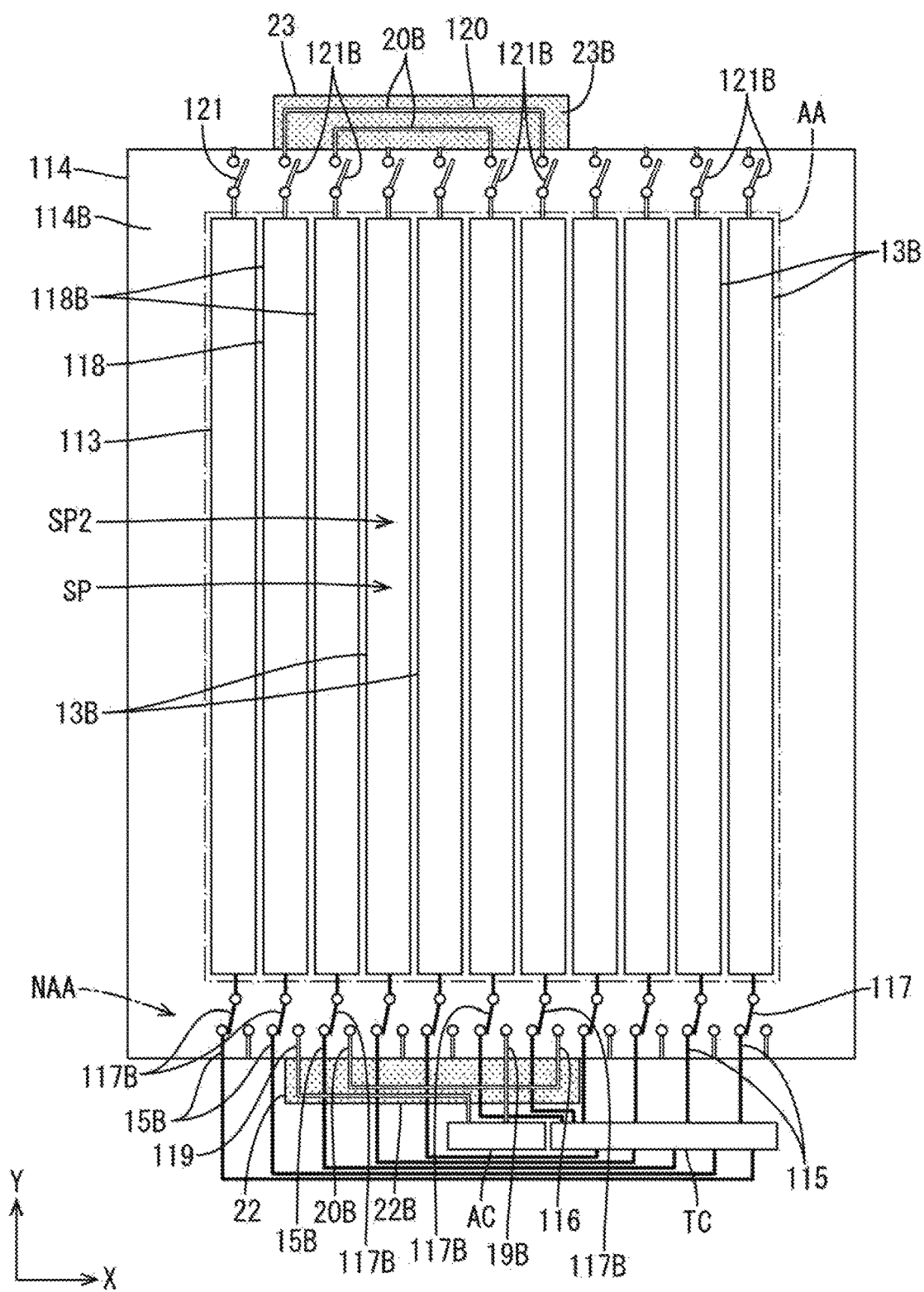
FIG. 10 is a plan view of a second electrode substrate constituting a touch panel.

As illustrated in FIGS. 9 and 10, an electrode substrate 114 according to the present embodiment is provided with a plurality of switches 117 in a manner where the switches 117 are individually connected to all of the plurality of electrodes 113. Similarly, the electrode substrate 114 is provided with a plurality of short-circuit changeover switches 121 in a manner where the short-circuit changeover switches 121 are individually connected to all of the plurality of electrodes 113. The number of switches 117 and the number of short-circuit changeover switches 121 installed on the electrode substrate 114 are the same as the number of installed electrodes 113. The switches 117 and the short-circuit changeover switches 121 are arranged on the electrode substrate 114 at positions that sandwich the electrodes 113 from both sides in the extension direction of the electrodes 113. That is, each switch 117 is connected to one end side of each electrode 113 and each short-circuit changeover switch 121 is connected to another end side of each electrode 113. Specifically, as illustrated in FIG. 9, on a first electrode substrate 114A, a first switch 117A is connected to the left side end portion in FIG. 9 of a first electrode 113A and a first short-circuit changeover switch 121A is connected to a right side end portion in FIG. 9 of the first electrode 113A. In contrast, as illustrated in FIG. 10, on a second electrode substrate 114B, a second switch 117B is connected to the lower side end portion in FIG. 10 of a second electrode 113B and a second short-circuit switch 121B is connected to the upper side end portion in FIG. 10 of the second electrode 113B.

Further, as illustrated in FIGS. 9 and 10, the touch panel 112 according to the present embodiment includes an external connection flexible substrate (second substrate) 22 including external connection wiring lines 119 and short-circuit wiring lines 120 constituting an antenna circuit 116, and a short-circuit flexible substrate (third substrate) 23 including the short-circuit wiring lines 120 and not the external connection wiring lines 119. The external connection flexible substrate 22 and the short-circuit flexible substrate 23 are mounted to the electrode substrate 114. Note that in FIGS. 9 to 16, the external connection flexible substrate 22 and the short-circuit flexible substrate 23 are illustrated as shaded. Specifically, the external connection flexible substrate 22 is mounted to a side portion of the electrode substrate 114 on which the switch 117 is installed in the extension direction of the electrode 113. The external connection flexible substrate 22 is provided with two external connection wiring lines 119 connected to the shared electrode 118 via the switch 117, and one short-circuit wiring line 120 connected to the shared electrode 118 via the switch 117. The length dimension of the external connection flexible substrate 22 is smaller than the length dimension of the side of the electrode substrate 114 on which the external connection flexible substrate 22 is mounted. The short-circuit flexible substrate 23 is mounted to a side of the electrode substrate 114 on which the short-circuit changeover switches 121 are installed in the extension direction of the electrode 113. In other words, the short-circuit flexible substrate 23 is mounted to a side of the electrode substrate 114 opposite to the side on which the external connection flexible substrate 22 is mounted. The short-circuit flexible substrate 23 is provided with two short-circuit wiring lines 120 connected to the shared electrodes 118 via the short-circuit changeover switch 121. The short-circuit flexible substrate 23 has a length dimension that is smaller than a length dimension of the side of the electrode substrate 114 on which the short-circuit flexible substrate 23 is mounted.

As illustrated in FIGS. 9 and 10, the external connection flexible substrate 22 includes a first external connection flexible substrate 22A mounted to the first electrode substrate 114A and a second external connection flexible substrate 22B mounted to the second electrode substrate 114B. The short-circuit flexible substrate 23 includes a first short-circuit flexible substrate 23A mounted to the first electrode substrate 114A and a second short-circuit flexible substrate 23B mounted to the second electrode substrate 114B. As illustrated in FIG. 9, the first external connection flexible substrate 22A is mounted to the left side portion in FIG. 9 of the first electrode substrate 114A and the first short-circuit flexible substrate 23A is mounted to the right side portion in FIG. 9 of the first electrode substrate 114A. As illustrated in FIG. 10, the second external connection flexible substrate 22B is mounted to the lower side portion in FIG. 10 of the second electrode substrate 114B and the second short-circuit flexible substrate 23B is mounted to the upper side portion in FIG. 10 of the second electrode substrate 114B.

Figure 11:
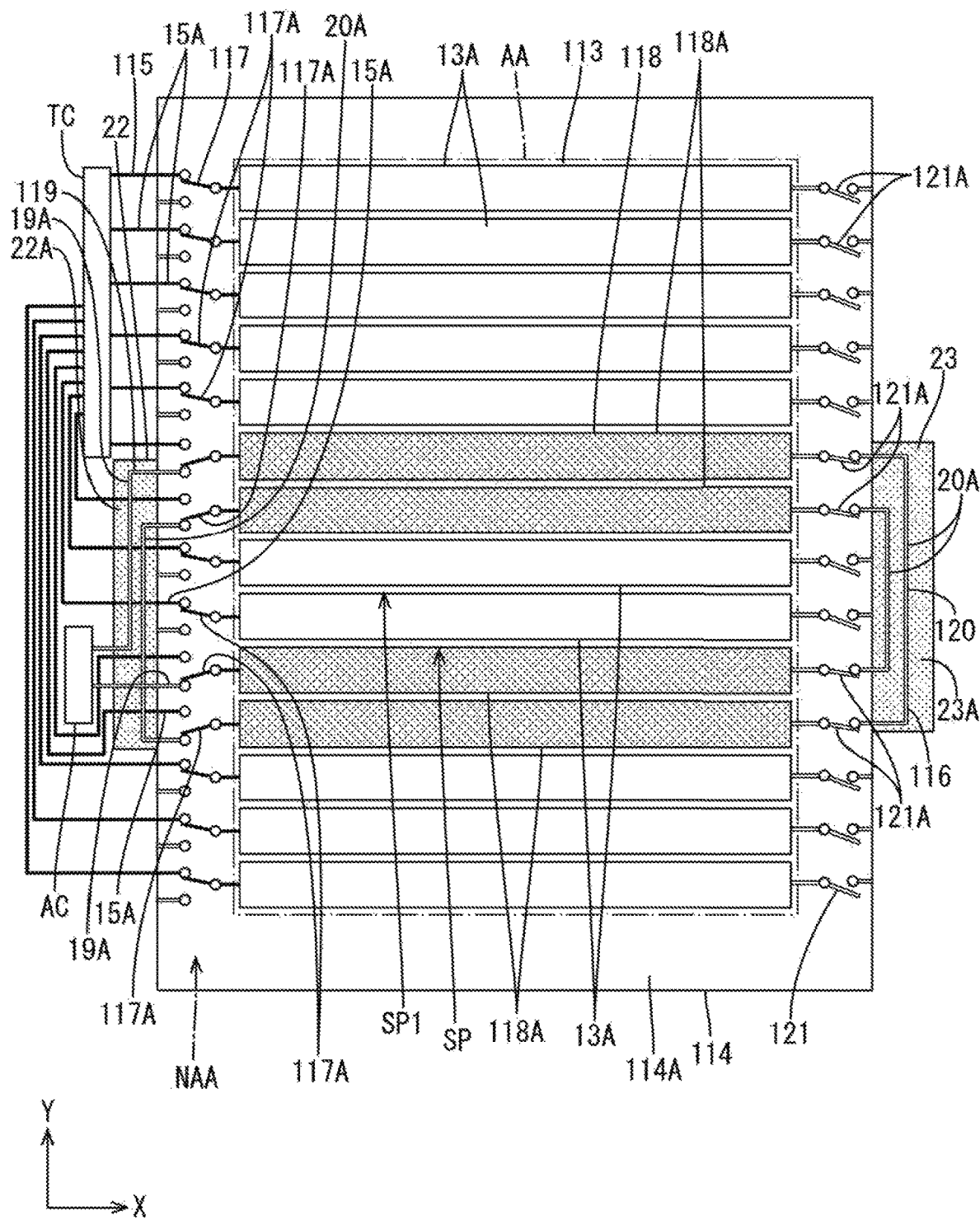
FIG. 11 is a plan view of a first electrode substrate during an antenna period.
Figure 12:
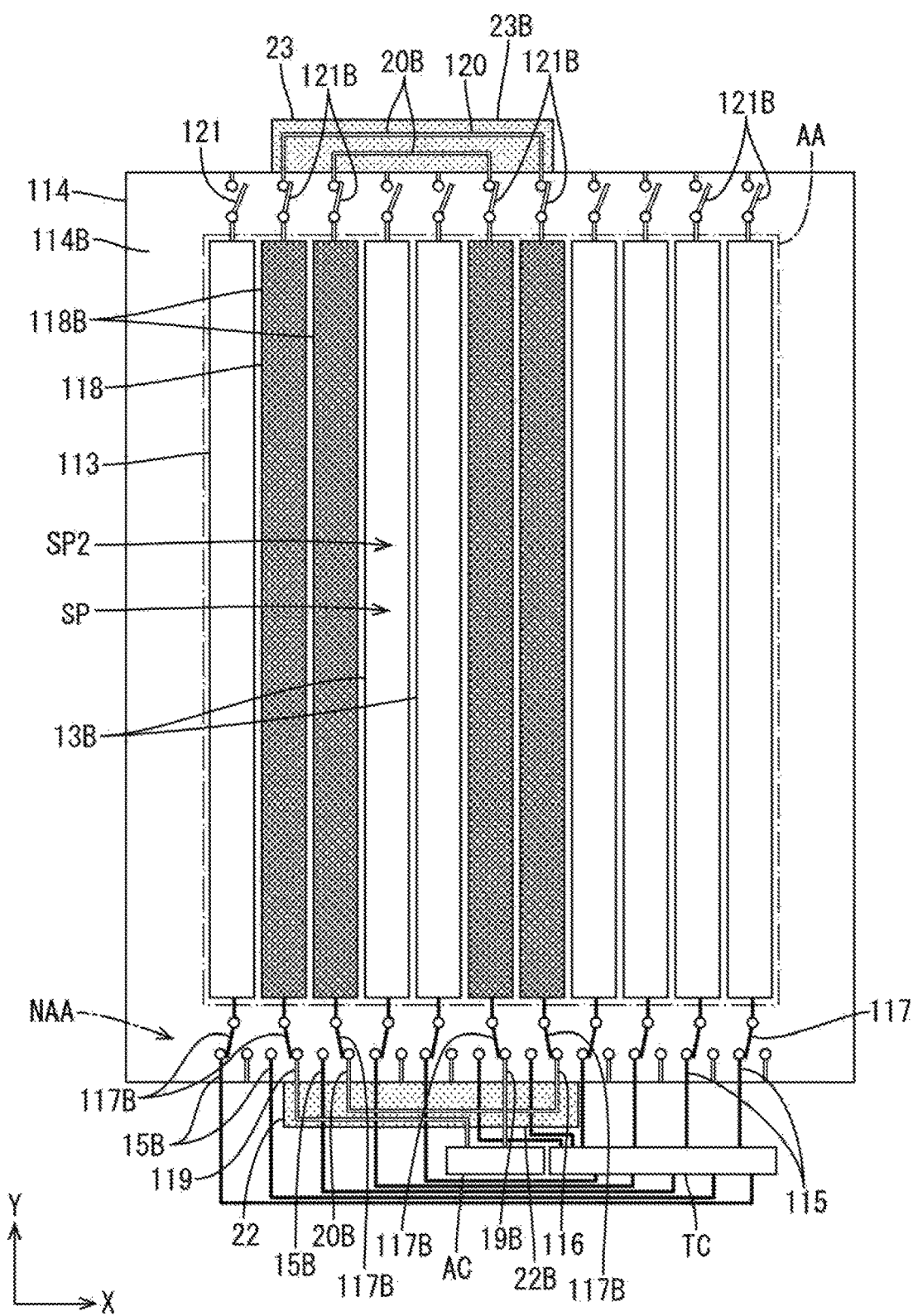
FIG. 12 is a plan view of a second electrode substrate during an antenna period.
Figure 13:
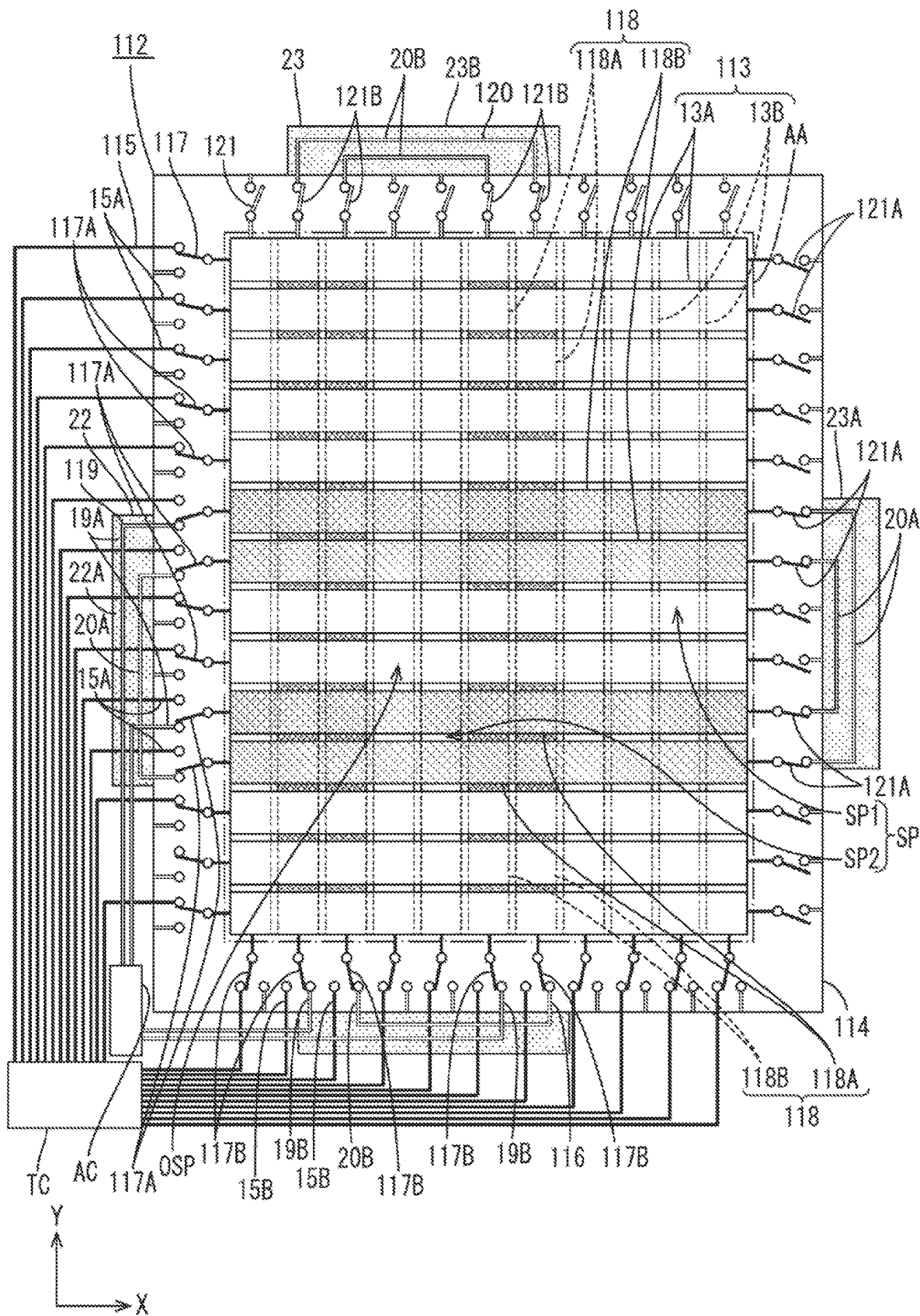
FIG. 13 is a plan view of a touch panel during an antenna period.

When the external connection flexible substrate 22 and the short-circuit flexible substrate 23 having the configuration described above are mounted to the electrode substrate 114, as illustrated in FIGS. 9 and 10, the external connection wiring line 119 and the short-circuit wiring line 120 are connected to the switch 117 and the short-circuit changeover switch 121 located at the mounting positions of the external connection flexible substrate 22 and the short-circuit flexible substrate 23. At this time, the electrodes 113 connected to the external connection wiring lines 119 and the short-circuit wiring lines 120 via the switches 117 and the short-circuit changeover switches 121 are the shared electrodes 118. When the touch panel 112 is set to the antenna period AP in this state, as illustrated in FIGS. 11 to 13, other end sides of the switches 117, which have one end sides connected to the shared electrodes 118, are connected to the antenna circuit 116 and the short-circuit changeover switches 121, which have one end sides connected to the shared electrodes 118, turn ON. Accordingly, pulses output from the antenna controller AC are supplied to the shared electrodes 118 via the external connection wiring lines 119 and the short-circuit wiring lines 120 constituting the antenna circuit 116 and the switches 117 and the short-circuit changeover switches 121. Note that in FIGS. 11 to 13, the electrodes 113 to be energized are illustrated as shaded. Then, magnetic fields are generated in the first spaces SP1 present between the four first shared electrodes 118A and magnetic fields are generated in the second spaces SP2 present between the four second shared electrodes 118B. The magnetic fields generated in the first spaces SP1 and in the second spaces SP2 exhibit a strong interaction in the overlapping space OSP to generate a stronger magnetic field in the overlapping space OSP than in a non-overlapping space. This strong magnetic field can be used to stably perform near field wireless communication with an external device. Note that the transmission circuits and the like of the pulses output from the antenna controller AC to each of the shared electrodes 118A, 118B are as described above in the first embodiment. Further, in the position detection period PP, as described above in the first embodiment, all of the switches 117 are connected to the position detection circuit 115 and all of the short-circuit changeover switches 121 enter the OFF state. Thus, the pulses output from the touch controller TC are supplied to all of the electrodes 113.

Incidentally, in the touch panel 112 according to the present embodiment, the mounting positions of the external connection flexible substrate 22 and the short-circuit flexible substrate 23 on the electrode substrate 114 can be changed from the positions illustrated in FIGS. 9 and 10. When the mounting positions of the external connection flexible substrate 22 and the short-circuit flexible substrate 23 on the electrode substrate 114 are changed, the switches 117 and the short-circuit changeover switches 121 connected to the external connection wiring lines 119 and the short-circuit wiring lines 120 are changed and which electrodes 113 of the plurality of electrodes 113 are the shared electrodes 118 also changes.

Figure 14:
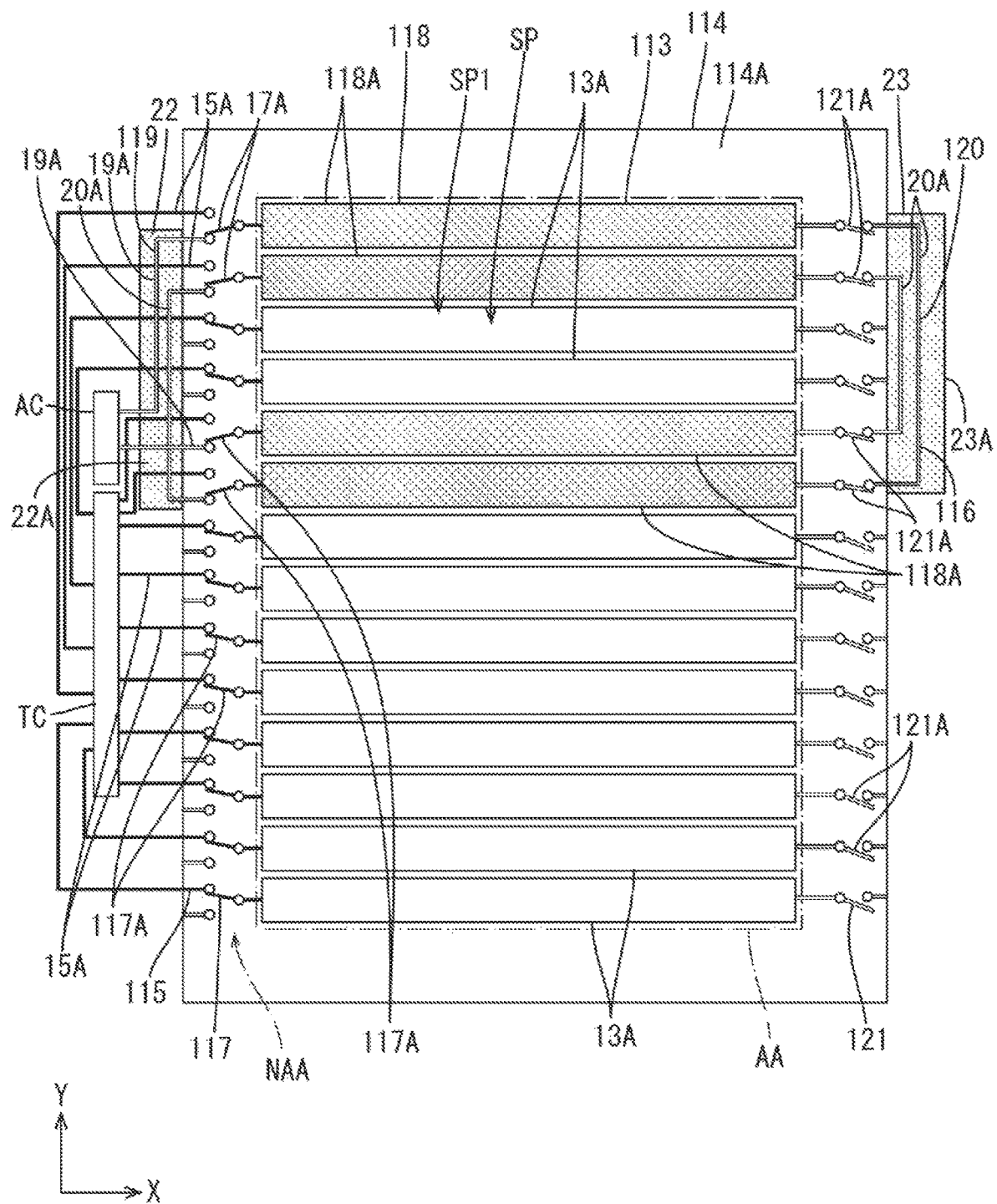
FIG. 14 is a plan view illustrating a state where mounting positions of a first external connection flexible substrate and a first short-circuit flexible substrate on a first electrode substrate have been changed.
Figure 15:
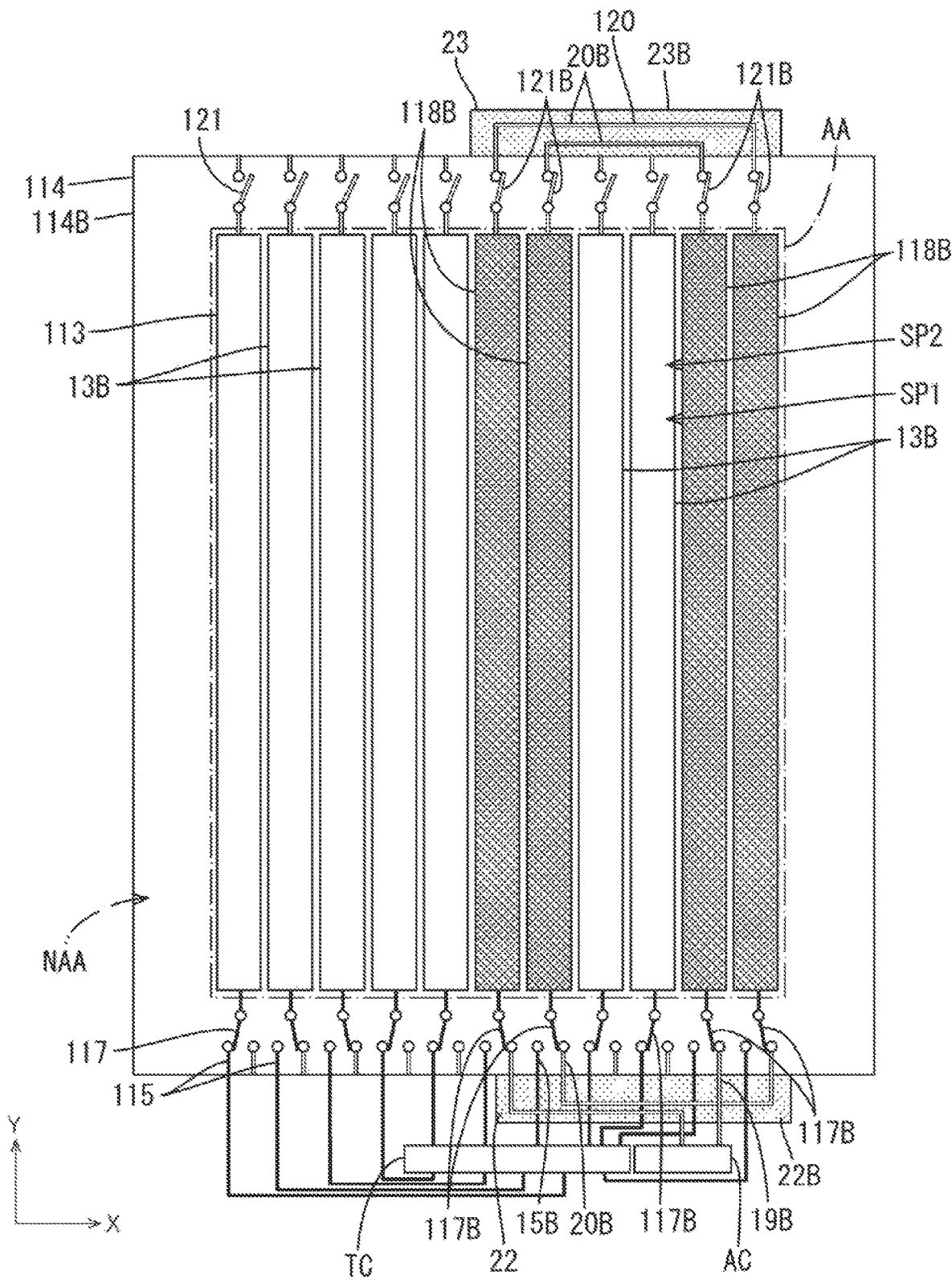
FIG. 15 is a plan view illustrating a state where mounting positions of a second external connection flexible substrate and a second short-circuit flexible substrate on a second electrode substrate have been changed.
Figure 16:
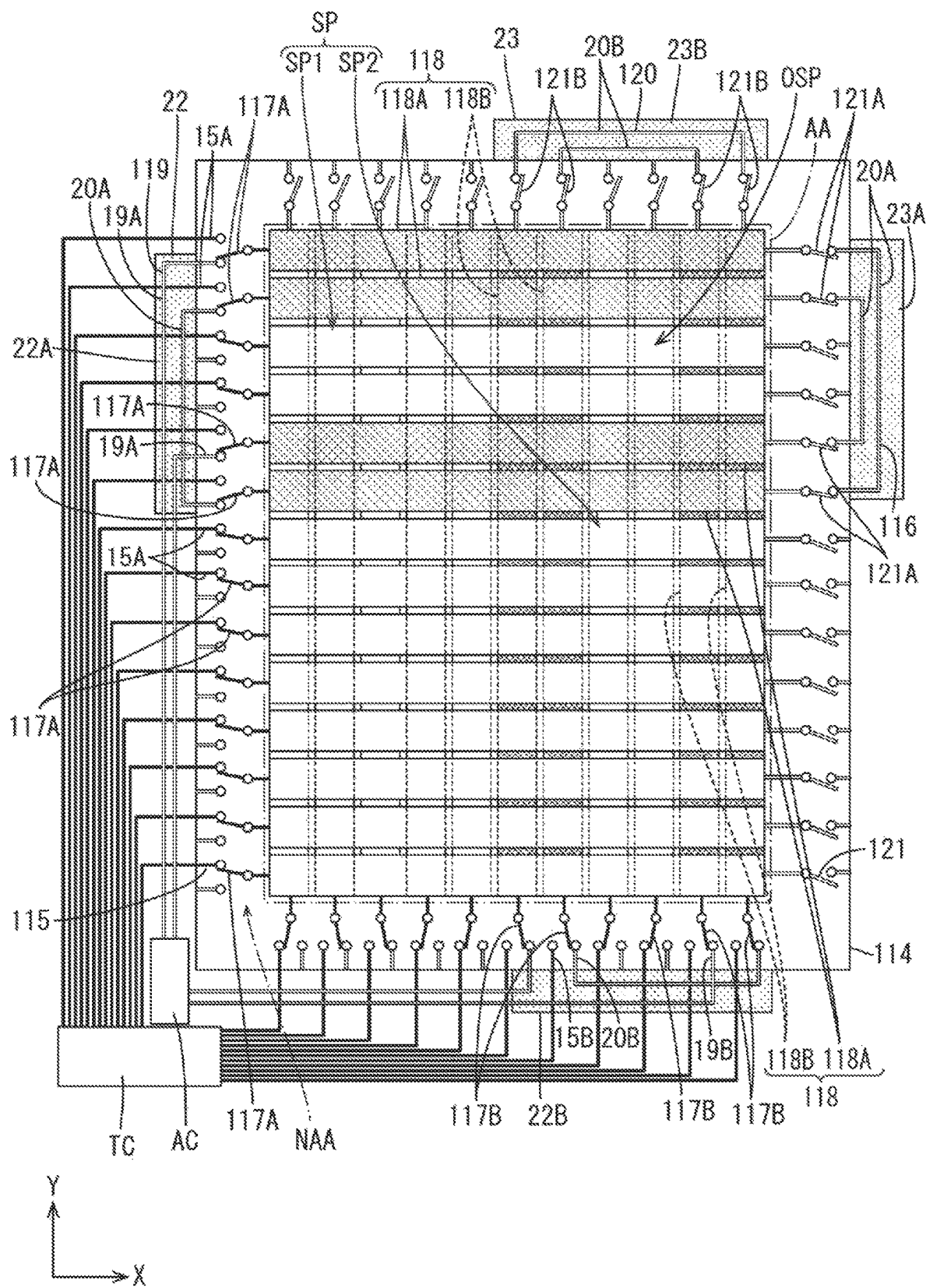
FIG. 16 is a plan view of a touch panel during an antenna period.

Specifically, as illustrated in FIG. 14, the mounting positions of the first external connection flexible substrate 22A and the first short-circuit flexible substrate 23A on the first electrode substrate 114A can be changed to near the upper edge in FIG. 14. In this case, the first first electrode 113A, the second first electrode 113A, the fifth first electrode 113A, and the sixth first electrode 113A counting from the upper edge in FIG. 14 are each the first shared electrode 118A. As illustrated in FIG. 16, the first space SP1 in which the magnetic field is generated during the antenna period AP is arranged to overlap the third first electrode 113A and the fourth first electrode 113A counting from the upper edge in FIG. 16. In contrast, as illustrated in FIG. 15, the mounting positions of the second external connection flexible substrate 22B and the second short-circuit flexible substrate 23B on the second electrode substrate 114B can be changed to near the right edge in FIG. 15. In this case, the sixth second electrode 113B, the seventh second electrode 113B, the tenth second electrode 113B, and the eleventh second electrode 113B counting from the left edge in FIG. 15 are each the second shared electrode 118B. As illustrated in FIG. 16, the second space SP2 in which the magnetic field is generated during the antenna period AP is arranged to overlap the eighth second electrode 113B and the ninth second electrode 113B counting from the left edge in FIG. 16. Further, the overlapping space OSP in which the first space SP1 and the second space SP2 overlap and in which a particularly strong magnetic field is generated changes from the position illustrated in FIG. 13 to an upper right position. By adjusting the mounting positions of the external connection flexible substrate 22 and the short-circuit flexible substrate 23 on the electrode substrate 114 in this way, the position at which the antenna function is achieved on the plate surface of the touch panel 112 can be changed as appropriate. Note that the specific mounting positions of the external connection flexible substrate 22 and the short-circuit flexible substrate 23 on the electrode substrate 114 can be changed to positions other than those illustrated in FIGS. 14 to 16 as appropriate.

As described above, according to the present embodiment, the switches 117 are arranged to be individually connected to all of the plurality of electrodes 113. With this configuration, the switches 117 can be used to set particular electrodes 113 of the plurality of electrodes 113 as the shared electrodes 118 to achieve the antenna function. As a result, the positions of the spaces SP in which magnetic fields are generated by the shared electrodes 118 can be changed.

Further, the antenna circuit 116 includes at least an external connection wiring line 119 configured to connect two shared electrodes 118 included in the plurality of shared electrodes 118 to the external antenna controller AC, and a short-circuit wiring line 120 configured to short-circuit the two shared electrodes 118 included in the plurality of shared electrodes 118 and separated by the spaces SP, the position detecting device including an antenna function further including the electrode substrate (first substrate) 114 provided with at least the switch 117, and the external connection flexible substrate (second substrate) 22 provided with at least the external connection wiring line 119 and the short-circuit wiring line 120, the external connection flexible substrate 22 being mounted to the electrode substrate 114, and the external connection wiring line 119 and the short-circuit wiring line 120 being selectively connected to a particular switch 117 depending on the mounting position at which the external connection flexible substrate 22 is mounted to the electrode substrate 114. With this configuration, the external connection flexible substrate 22 provided with at least the external connection wiring lines 119 and the short-circuit wiring lines 120 is mounted to the electrode substrate 114 provided with at least the switches 117. The external connection wiring lines 119 constituting the antenna circuit 116 connect the two shared electrodes 118 to the external antenna controller AC, and the short-circuit wiring lines 120 constituting the antenna circuit 116 cause the two shared electrodes 118 separated by the spaces SP to short-circuit. Accordingly, when the antenna circuit 116 and the plurality of shared electrodes 118 are energized by the external antenna controller AC, magnetic fields are generated in the spaces SP present between the plurality of shared electrodes 118. Further, the external connection wiring lines 119 and the short-circuit wiring lines 120 are selectively connected to a particular switch 117 depending on the mounting position of the external connection flexible substrate 22 on the electrode substrate 114. Thus, by selecting the mounting position of the external connection flexible substrate 22 on the electrode substrate 114, a particular electrode 113 of the plurality of electrodes 113 can be set as the shared electrodes 118 to achieve the antenna function. As a result, convenience is excellent.

Further, the antenna circuit 116 includes at least a plurality of the short-circuit wiring lines 120, and a short-circuit changeover switch 121 that is individually connected to all of the plurality of electrodes 113 and connected to some of the plurality of short-circuit wiring lines 120, the short-circuit changeover switch 121 being configured to switch conduction/non-conduction between the plurality of electrodes 113 and the plurality of short-circuit wiring lines 120, the position detecting device including an antenna function further including a short-circuit flexible substrate (third substrate) 23 provided with the plurality of short-circuit wiring lines 120 and not provided with the external connection wiring line 119, the short-circuit flexible substrate 23 being mounted to the electrode substrate 114 on a side opposite to the external connection flexible substrate 22, in which, when the number of the plurality of shared electrodes 118 is 2n, two external connection wiring lines 119 and (n−1) short-circuit wiring lines 120 are provided on the external connection flexible substrate 22, and n short-circuit wiring lines 120 are provided on the short-circuit flexible substrate 23. With this configuration, when the external connection flexible substrate 22 is mounted to the electrode substrate 114, the two external connection wiring lines 119 and the (n−1) short-circuit wiring lines 120 provided on the external connection flexible substrate 22 are selectively connected to 2n, that is, an even number of shared electrodes 118 via the switches 117. On the other hand, when the short-circuit flexible substrate 23 is mounted to the electrode substrate 114 on the side opposite to the external connection flexible substrate 22, the n short-circuit wiring lines 120 provided on the short-circuit flexible substrate 23 are selectively connected to an even number of the shared electrodes 118 via the short-circuit changeover switches 121. The short-circuit flexible substrate 23 is provided with the short-circuit wiring lines 120 but not provided with the external connection wiring lines 119. The external connection wiring lines 119 are provided exclusively on the external connection flexible substrate 22. Therefore, it is possible to avoid a case where two external connection wiring lines 119 are distributed between the external connection flexible substrate 22 and the short-circuit flexible substrate 23 as in a case where the number of shared electrodes 118 is an odd number. Note that n is a natural number.

Third Embodiment

A third embodiment of the disclosure will be described with reference to FIGS. 17 to 25. In the third embodiment, the configuration of an external connection flexible substrate 222 and a short-circuit flexible substrate 223 are changed from that in the second embodiment described above. Note that redundant descriptions of structures, actions, and effects similar to those of the second embodiment described above will be omitted. Further, illustrations of the position detection circuit and the touch controller are incorporated in the drawings described above in the first and second embodiments.

Figure 17:
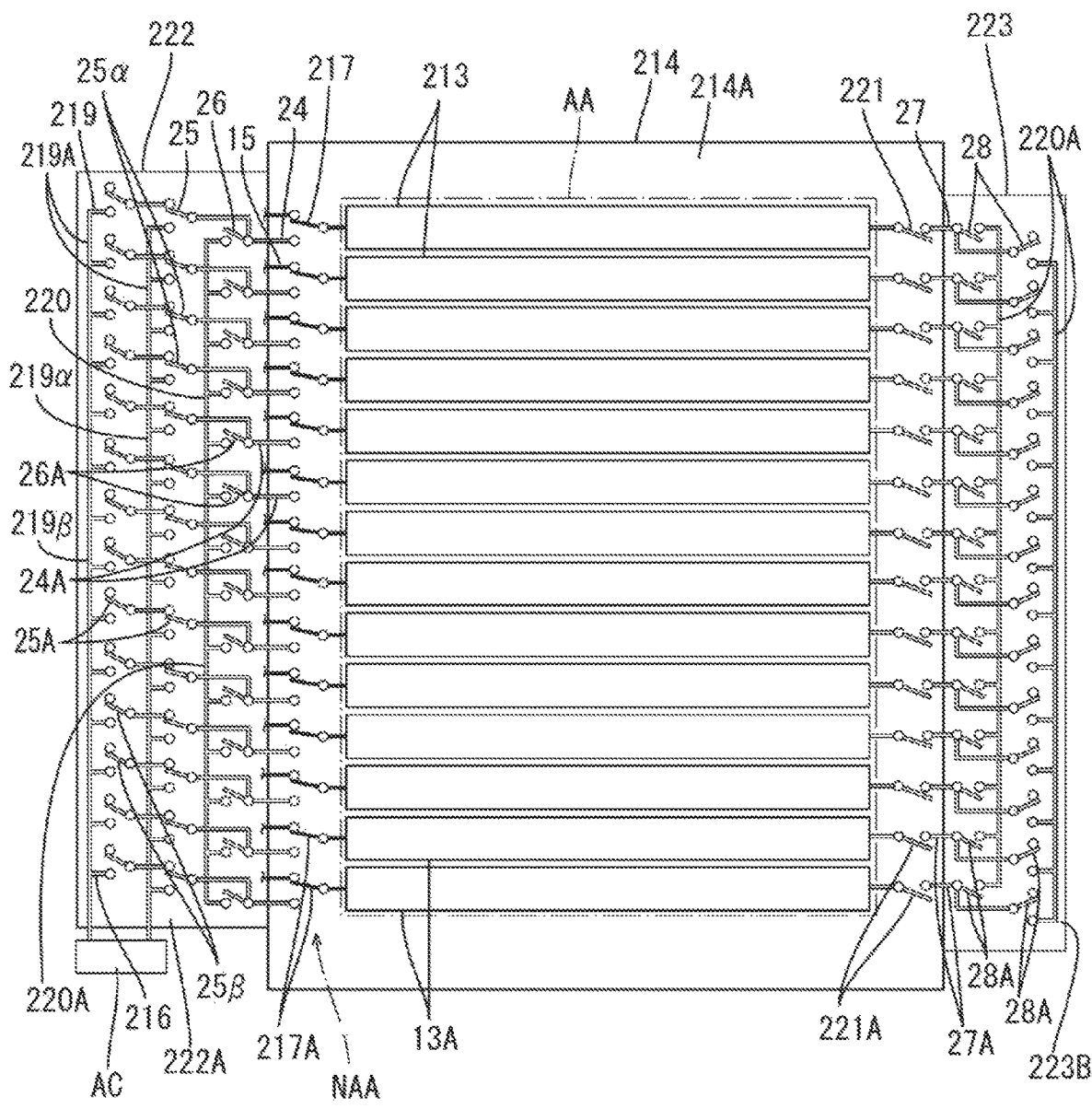
FIG. 17 is a plan view of a first electrode substrate constituting a touch panel according to a third embodiment of the disclosure.
Figure 18:
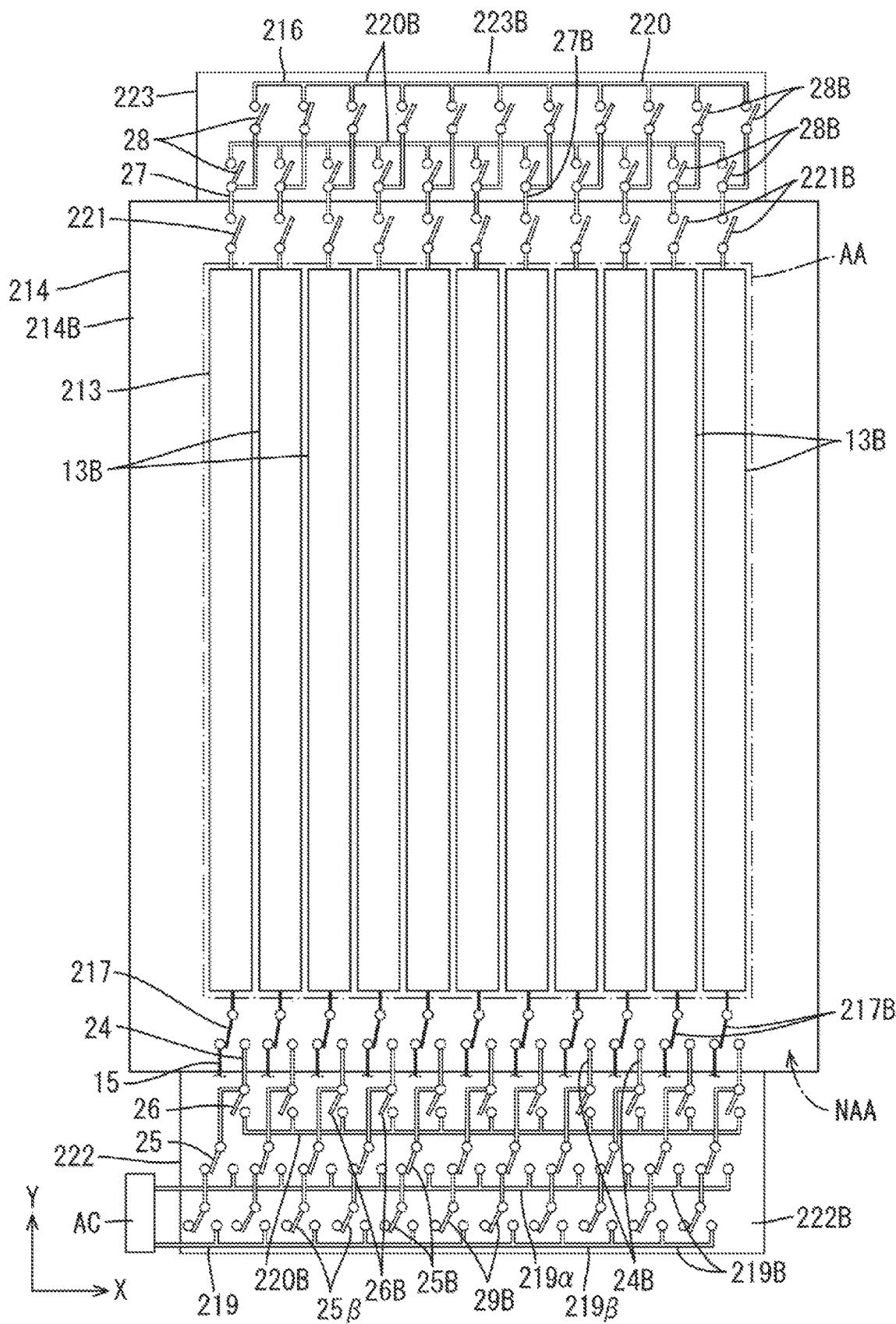
FIG. 18 is a plan view of a second electrode substrate constituting a touch panel.

As illustrated in FIGS. 17 and 18, the external connection flexible substrate 222 according to the present embodiment is provided with a plurality of switch connection portions 24 that constitute an antenna circuit 216. When the external connection flexible substrate 222 is mounted to an electrode substrate 214, the plurality of switch connection portions 24 are individually connected to each of a plurality of switches 217 that are individually connected to a plurality of electrodes 213 on the electrode substrate 214. The number of installed switch connection portions 24 is the same as the number of installed switches 217. Accordingly, the length dimension of the external connection flexible substrate 222 is similar to the length dimension of the side of the electrode substrate 214 on which the external connection flexible substrate 222 is mounted. Thus, the external connection flexible substrate 222 according to the present embodiment differs from the second embodiment described above in that the mounting position of the external connection flexible substrate 222 on the electrode substrate 214 is fixed. The switch connection portion 24 includes a first switch connection portion 24A provided on a first external connection flexible substrate 222A mounted to a first electrode substrate 214A, and a second switch connection portion 24B provided on a second external connection flexible substrate 222B mounted to a second electrode substrate 214B. Note that in the present embodiment, when differentiating between two external connection wiring lines 219 connected to the antenna controller AC, an external connection wiring line 219 disposed near a short-circuit wiring line 220 (switch connection portion 24) in each drawing is denoted by adding the character "α" to the reference symbol to indicate "one external connection wiring line", and an external connection wiring line 219 disposed far from the short-circuit wiring line 220 (switch connection portion 24) in each drawing is denoted by adding the character "β" to the reference symbol to indicate "another external connection wiring line". These symbols are not used when collectively referring to the two external connection wiring lines 219.

As illustrated in FIGS. 17 and 18, on the external connection flexible substrate 222, the external connection wiring lines 219 and the short-circuit wiring lines 220 are selectively connected to the plurality of switch connection portions 24. Specifically, the antenna circuit 216 includes a plurality of external connection wiring line switches 25 connected to each of the plurality of switch connection portions 24 and the external connection wiring lines 219, and a plurality of short-circuit wiring line switches 26 connected to each of the plurality of switch connection portions 24 and the short-circuit wiring lines 220. The plurality of external connection wiring line switches 25 includes one external connection wiring line switch 25α connected to one external connection wiring line 219α, and a plurality of other external connection wiring line switches 25β connected to another external connection wiring line 219β. A plurality of the one external connection wiring line switches 25α are individually connected to the plurality of switch connection portions 24. The number of installed external connection wiring line switches 25α is the same as the number of installed switch connection portions 24. The one external connection wiring line switch 25α can selectively connect any of the plurality of switch connection portions 24 to the one external connection wiring line 219α. A plurality of the other external connection wiring line switches 25β are individually connected to the plurality of one external connection wiring line switches 25α. The number of installed other external connection wiring line switches 25β is the same as the number of installed one external connection wiring line switches 25α. The other external connection wiring line switch 25β can selectively connect any of the plurality of one external connection wiring lines 25α to the other external connection wiring line 219β. The other external connection wiring lines 219β are connected to the switch connection portions 24 via the external connection wiring line switches 25α, 25β. The plurality of short-circuit wiring line switches 26 are individually connected to the plurality of switch connection portions 24. The number of installed short-circuit wiring switches 26 is the same as the number of installed switch connection portions 24. The plurality of short-circuit wiring line switches 26 can selectively connect any of the plurality of switch connection portions 24 to the short-circuit wiring line 220. Accordingly, by adjusting the switching states of the switches 217, the external connection wiring line switches 25, and the short-circuit wiring line switches 26 during the antenna period AP, particular electrodes 213 of the plurality of electrodes 213 can be set as shared electrodes 218 connected to the external connection wiring lines 219 and the short-circuit wiring lines 220 as desired. Note that the external connection wiring line switch 25 and the short-circuit wiring line switch 26 may be either a mechanical switch or an electronic switch provided that the external connection wiring line switch 25 and the short-circuit wiring line switch 26 can transmit pulses provided to the antenna circuit 216. The external connection wiring line switch 25 and the short-circuit wiring line switch 26 are connected to a switch controller such that the switch controller mechanically or electronically controls the switching states of the external connection wiring line switch 25 and the short-circuit wiring line switch 26. The external connection wiring line switch 25 and the short-circuit wiring line switch 26 include a first external connection wiring line switch 25A and a first short-circuit wiring line switch 26A provided on the first external connection flexible substrate 222A, and a second external connection wiring line switch 25B and a second short-circuit wiring line switch 26B provided on the second external connection flexible substrate 222B.

As illustrated in FIGS. 17 and 18, the short-circuit flexible substrate 223 according to the present embodiment is provided with a plurality of short-circuit switch connection portions (second switch connection portions) 27 that constitute the antenna circuit 216. When the short-circuit flexible substrate 223 is mounted to the electrode substrate 214, the plurality of short-circuit switch connection portions 27 are individually connected to each of the plurality of short-circuit changeover switches 221 that are individually connected to the plurality of electrodes 213 on the electrode substrate 214. The number of installed short-circuit switch connection portions 27 is the same as the number of installed short-circuit changeover switches 221. Accordingly, the length dimension of the short-circuit flexible substrate 223 is equivalent to the length dimension of the side of the electrode substrate 214 on which the short-circuit flexible substrate 223 is mounted. Thus, the short-circuit flexible substrate 223 according to the present embodiment differs from the second embodiment described above in that the mounting position of the short-circuit flexible substrate 223 on the electrode substrate 214 is fixed. The short-circuit switch connection portion 27 includes a first short-circuit switch connection portion 27A provided on the first external connection flexible substrate 222A mounted to the first electrode substrate 214A, and a second short-circuit switch connection portion 27B provided on the second external connection flexible substrate 222B mounted to the second electrode substrate 214B.

As illustrated in FIGS. 17 and 18, on the short-circuit flexible substrate 223, two short-circuit wiring lines 220 are selectively connected to the plurality of short-circuit switch connection portions 27. Specifically, the antenna circuit 216 includes a plurality of short-circuit switches (second short-circuit wiring line switches) 28 connected to each of the plurality of short-circuit switch connection portions 27 and the short-circuit wiring lines 220. The plurality of short-circuit switches 28 are individually connected to the plurality of short-circuit switch connection portions 27. The number of installed short-circuit switches 28 is the same as twice (n times) the number of installed short-circuit switch connection portions 27, which is consistent with the number of short-circuit wiring lines 220 provided on the short-circuit flexible substrate 223. The plurality of short-circuit switches 28 can selectively connect any of the plurality of short-circuit connection portions 27 to each of two short-circuit wiring lines 220. Accordingly, by adjusting the switching states of the short-circuit changeover switches 221 and the short-circuit changeover switches 28 during the antenna period AP, particular electrodes 213 of the plurality of electrodes 213 can be set as the shared electrodes 218 connected to the short-circuit wiring lines 220 as desired. Note that the short-circuit switch 28 may be either a mechanical switch or an electronic switch provided that the short-circuit switch 28 can transmit the pulses provided to the antenna circuit 216. The short-circuit switch 28 is connected to a switch controller such that the switching state of the short-circuit switch 28 is mechanically or electronically controlled by the switch controller. The short-circuit switch 28 includes a first short-circuit switch 28A provided on the first short-circuit flexible substrate 223A and a second short-circuit switch 28B provided on the second short-circuit flexible substrate 223B.

Figure 19:
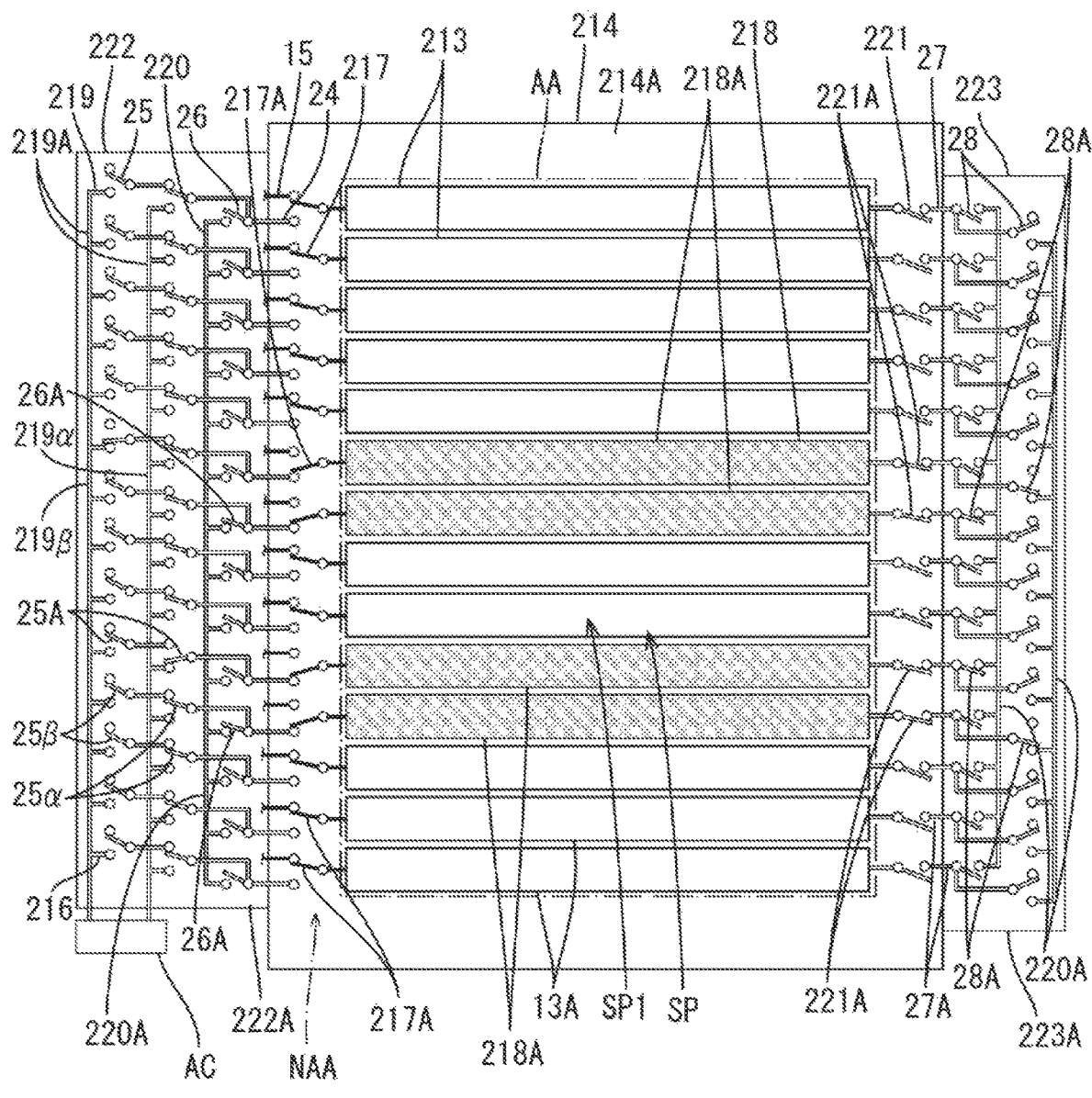
FIG. 19 is a plan view of a first electrode substrate during an antenna period.
Figure 20:
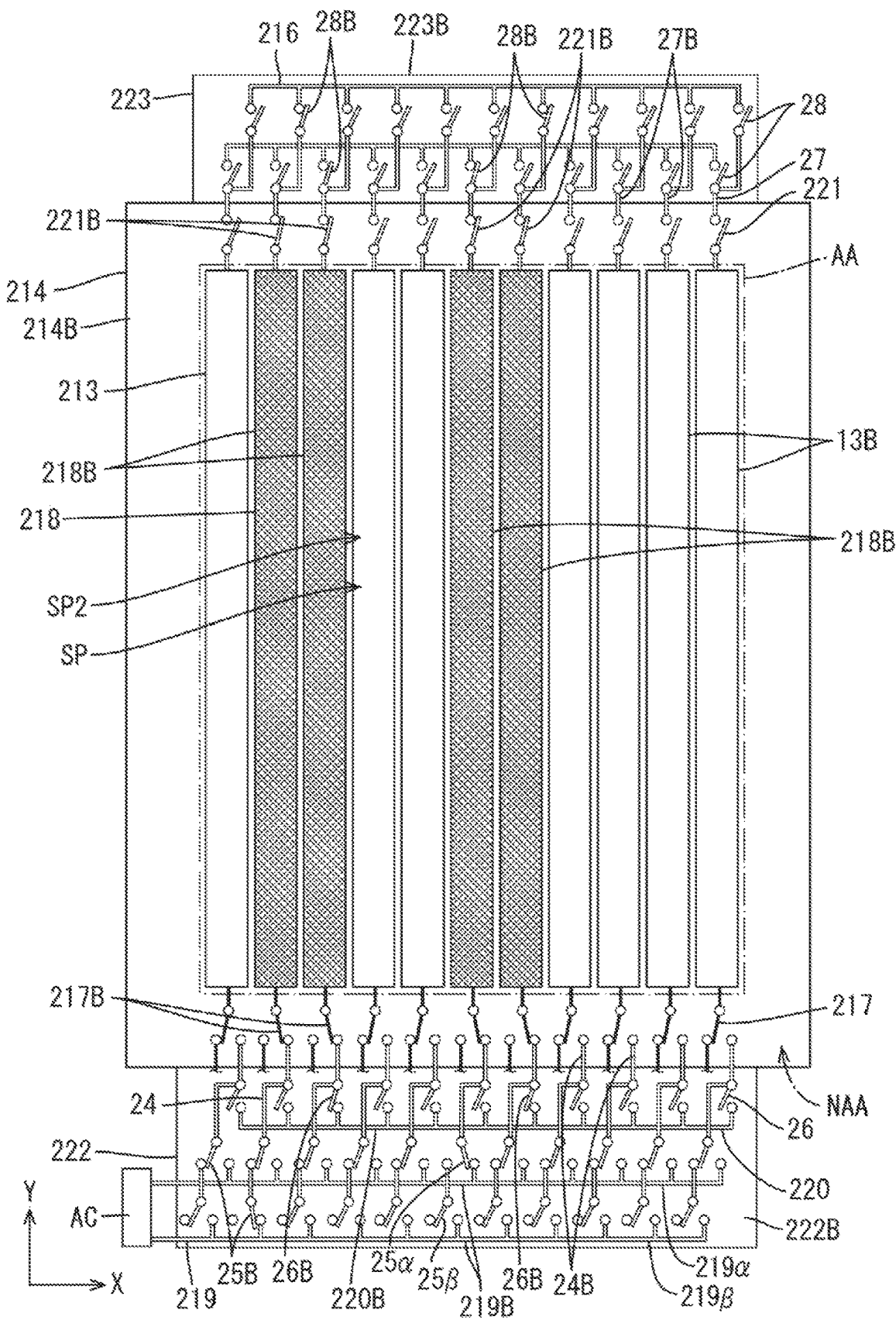
FIG. 20 is a plan view of a second electrode substrate during an antenna period.
Figure 21:
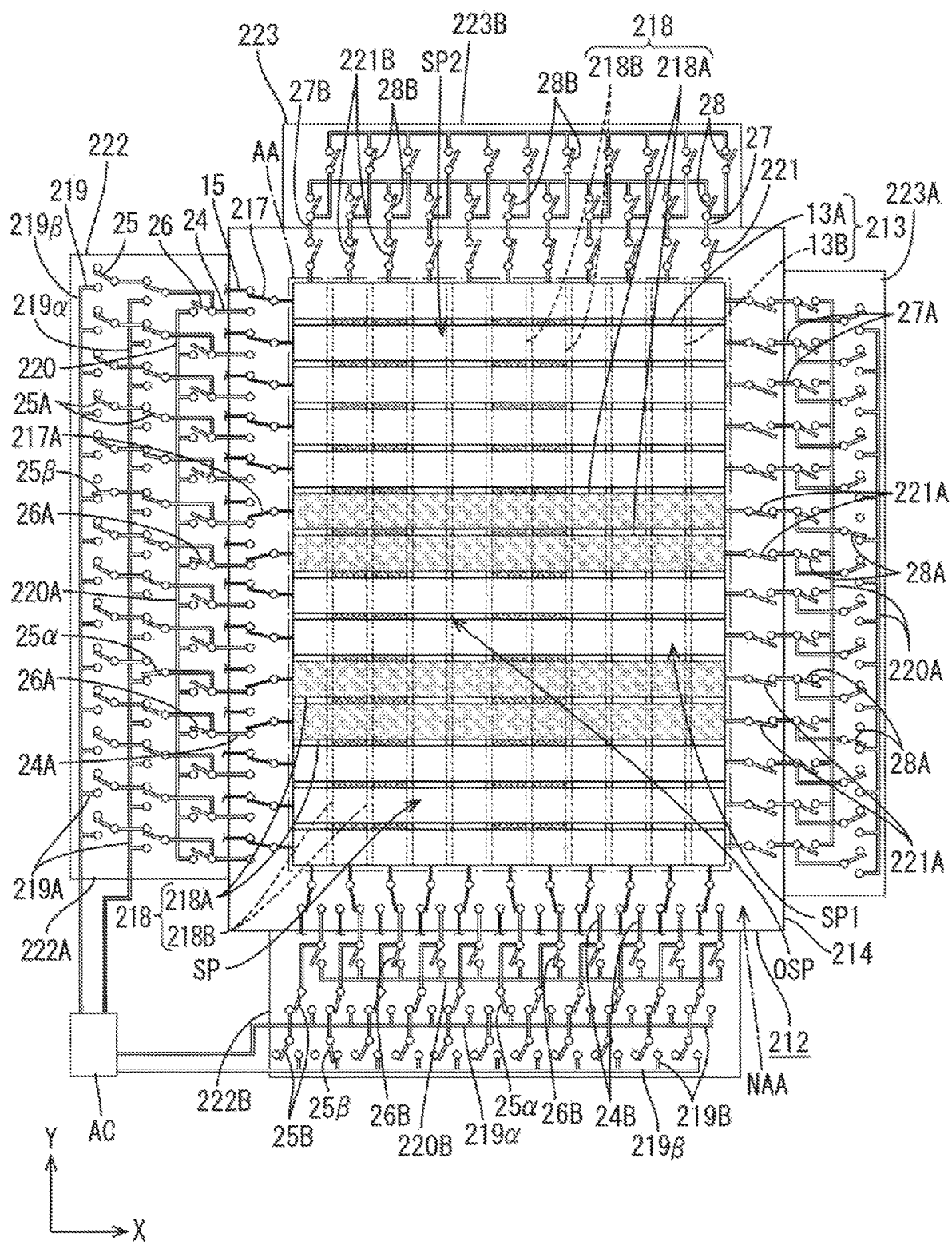
FIG. 21 is a plan view of a touch panel during an antenna period.

When the external connection flexible substrate 222 and the short-circuit flexible substrate 223 having the configuration described above are mounted to the electrode substrate 214, as illustrated in FIGS. 17 and 18, the plurality of switch connection portions 24 and short-circuit switch connection portions 27 are individually connected to the plurality of switches 217 and short-circuit changeover switches 221. At this time, by adjusting the switching states of each of the plurality of external connection wiring line switches 25, short-circuit wiring line switches 26 and short-circuit switches 28, the switch connection portions 24 and the short-circuit switch connection portions 27 connected to the external connection wiring lines 219 and the short-circuit wiring lines 220 can be set as desired. When the switching states of the external connection wiring line switches 25, the short-circuit wiring line switches 26, and the short-circuit switches 28 are as illustrated in FIGS. 17 and 18, the same electrodes 213 as described above in the first embodiment are the shared electrodes 218. When the touch panel 212 is set to the antenna period AP in this state, as illustrated in FIGS. 19 to 21, the other end sides of the switches 217, which have one end sides connected to the shared electrodes 218, are connected to the antenna circuit 216, and the short-circuit changeover switches 221, which have one end sides connected to the shared electrodes 218, turn ON. As a result, the pulses output from the antenna controller AC are supplied to the shared electrodes 218 via the external connection wiring lines 219 and the short-circuit wiring lines 220 constituting the antenna circuit 216, and the switches 25, 26, 28, 217, 221. Note that in FIGS. 19 to 21, the electrodes 213 to be energized are illustrated as shaded. Then, magnetic fields are generated in the first spaces SP1 present between four first shared electrodes 218A, and magnetic fields are generated in the second spaces SP2 between four second shared electrodes 218B. The magnetic fields generated in the first spaces SP1 and the second spaces SP2 exhibit a strong interaction in the overlapping space OSP to generate a stronger magnetic field in the overlapping space OSP than in a non-overlapping space. This strong magnetic field can be used to stably perform near field wireless communication with an external device.

Figure 22:
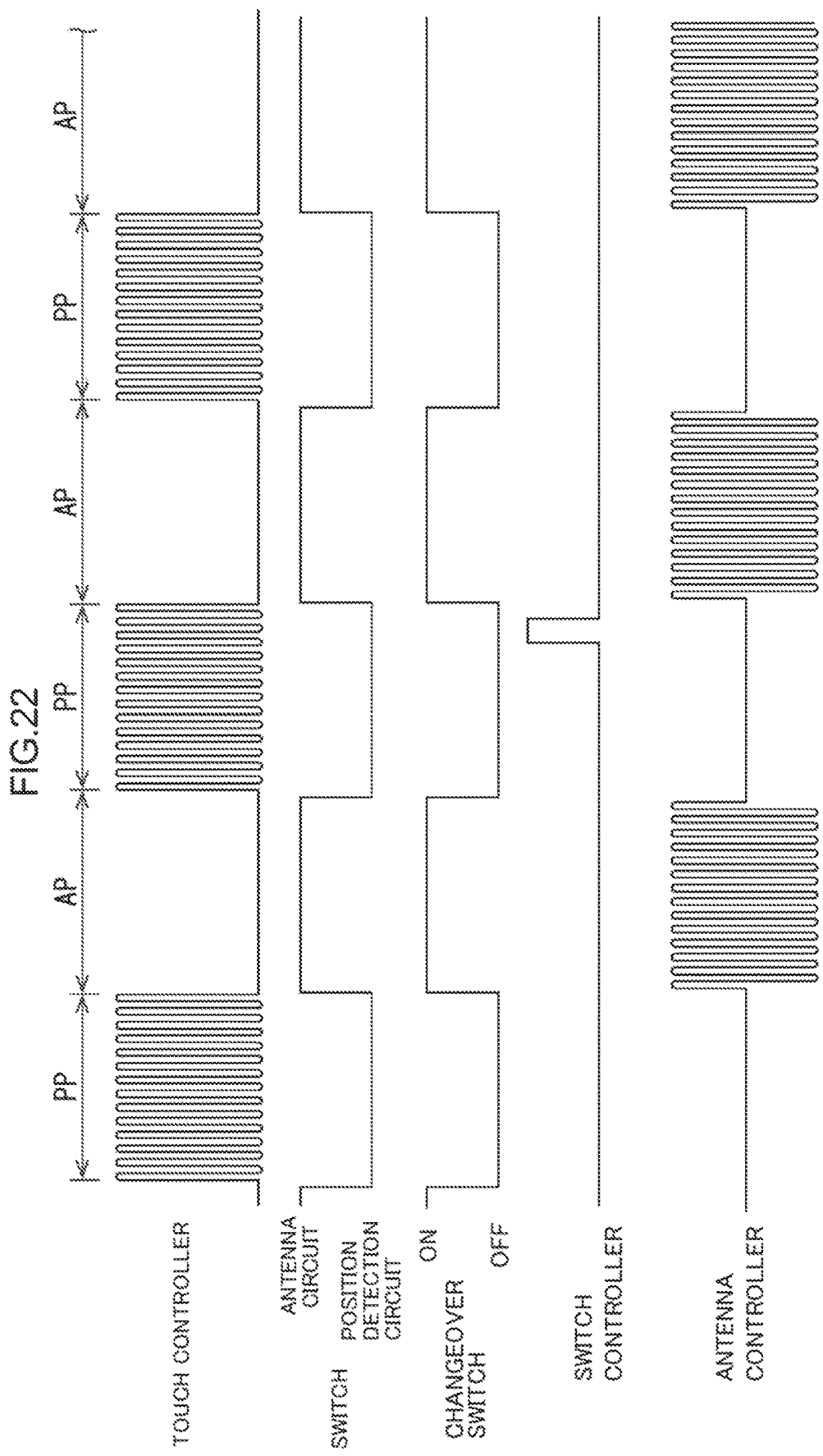
FIG. 22 is a timing chart showing drive of a touch controller, a switch, a short-circuit changeover switch, a switch controller, and an antenna controller.

Incidentally, in the touch panel 212 according to the present embodiment, even after the external connection flexible substrate 222 and the short-circuit flexible substrate 223 are mounted to the electrode substrate 214, which electrodes 213 of the plurality of electrodes 213 are to be used as the shared electrodes 218 can be changed as desired. To change the shared electrode 218, switching states of each of the plurality of external connection wiring line switches 25, short-circuit wiring line switches 26 and short-circuit switches 28 are adjusted, and the switch connection portions 24 and the short-circuit switch connection portions 27 connected to the external connection wiring lines 219 and the short-circuit wiring lines 220 may be changed. When performing this change, as illustrated in FIG. 22, a changeover signal is input to a switch controller that controls the switching state of each switch 25, 26, 28, 217, 221. When the changeover signal is input, the switch controller changes the pattern determining which external connection wiring line switch 25, short-circuit wiring line switch 26 and short-circuit switch 28 of the plurality of external connection wiring line switches 25, short-circuit wiring line switches 26 and short-circuit switches 28 is to be connected to the external connection wiring line 219 and the short-circuit wiring line 220. This changeover signal is preferably input during the position detection period PP immediately before the antenna period AP, which is subject to change. Note that FIG. 22 illustrates a simplified waveform of the changeover signal input to the switch controller.

Figure 23:
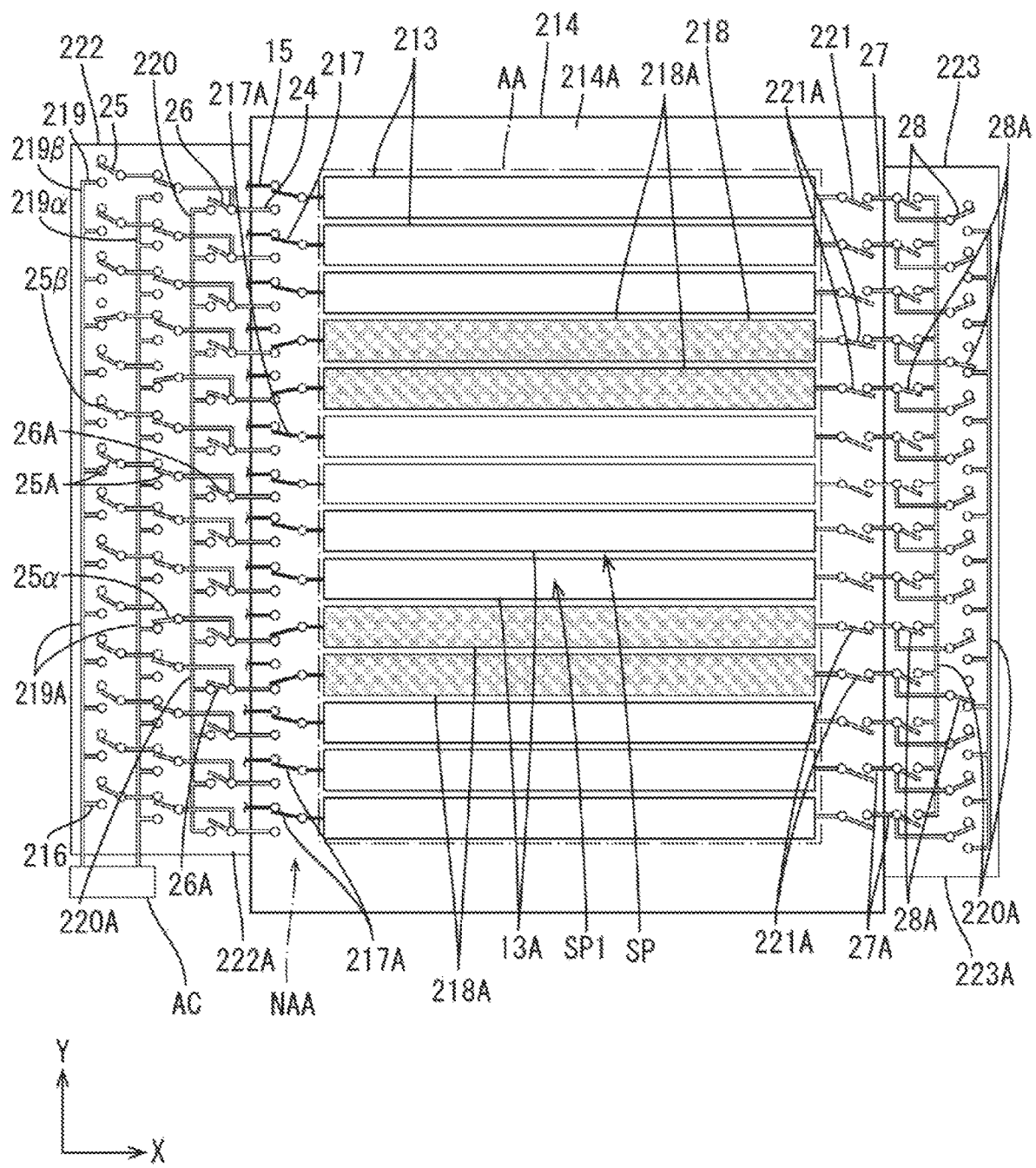
FIG. 23 is a plan view illustrating a state where a first shared electrode in a first electrode substrate is changed.
Figure 25:
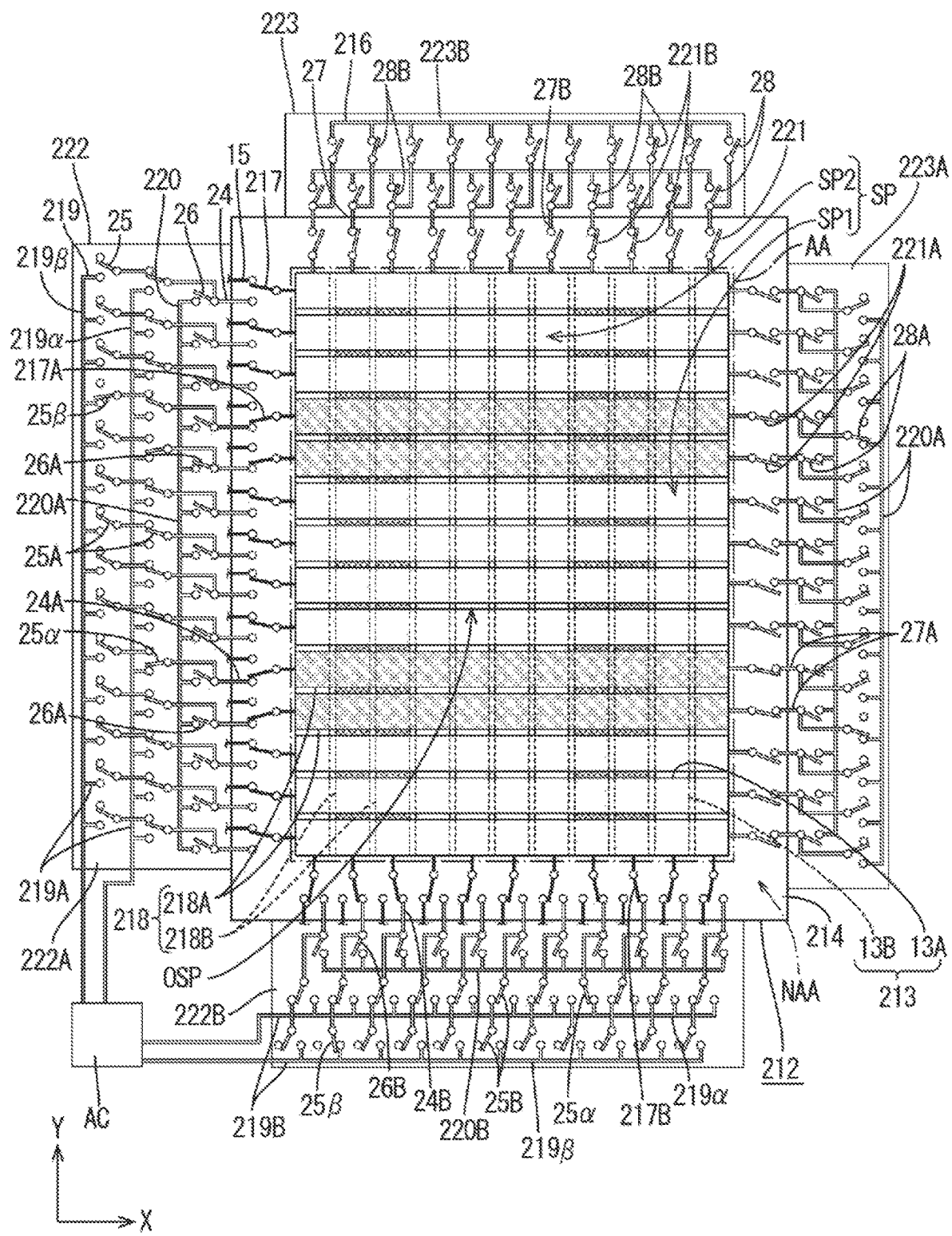
FIG. 25 is a plan view of a touch panel during an antenna period.

Specifically, when the changeover signal is input to the switch controller, as illustrated in FIG. 23, on the first electrode substrate 214A, four first switch connection portions 24A and four first short-circuit switch connection portions 27A connected to four first switches 217A and four first short-circuit changeover switches 221A, respectively, are connected to the first external connection wiring line 219A and the first short-circuit wiring line 220A via the first external connection wiring line switch 25A, the first short-circuit wiring line switch 26A and the first short-circuit switch 28A. The four first switches 217A and the four first short-circuit changeover switches 221A are to be connected to the fourth first electrode 213A, the fifth first electrode 213A, the tenth first electrode 213A, and the eleventh first electrode 213A counting from the upper edge in FIG. 23. Thus, the four first electrodes 213A described above are the first shared electrodes 218A. As illustrated in FIG. 25, the first space SP1 in which the magnetic field is generated during the antenna period AP is arranged to overlap the sixth first electrode 213A, the seventh first electrode 213A, the eight first electrode 213A, and the ninth first electrode 213A counting from the upper edge in FIG. 25. In other words, the width dimension of the first space SP1 is increased to approximately twice that in FIG. 21.

Figure 24:
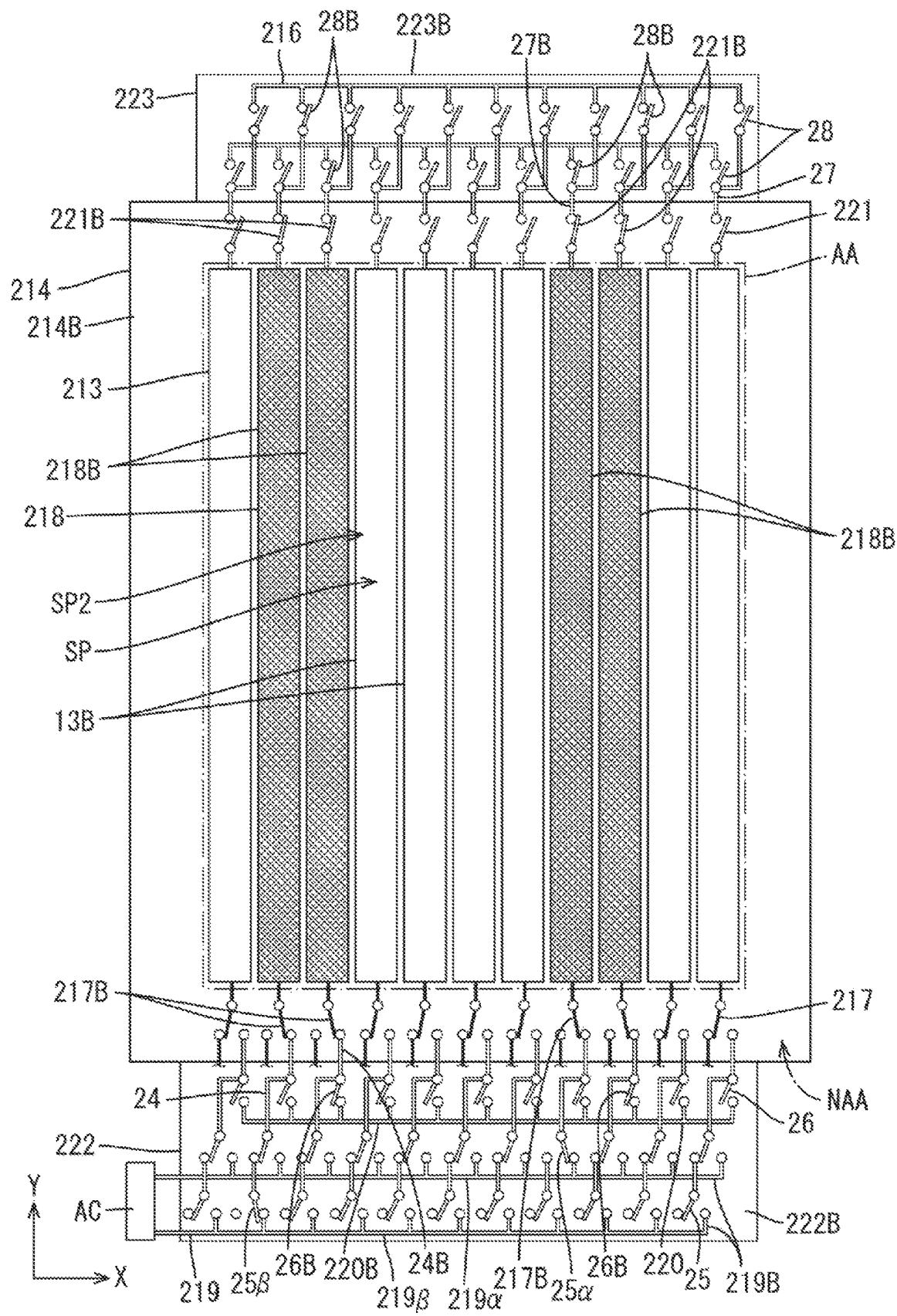
FIG. 24 is a plan view illustrating a state where a second shared electrode in a second electrode substrate is changed.

In contrast, as illustrated in FIG. 24, on the second electrode substrate 214B, four second switch connection portions 24B and four second short-circuit switch connection portions 27B connected to four second switches 217B and four second short-circuit changeover switches 221B, respectively, are connected to the second external connection wiring line 219B and the second short-circuit wiring line 220B via the second external connection wiring line switch 25B, the second short-circuit wiring line switch 26B, and the second short-circuit switch 28B. The four second switches 217B and the four second short-circuit changeover switches 221B are to be connected to the second second electrode 213B, the third second electrode 213B, the eighth second electrode 213B, and the ninth second electrode 213B counting from the left edge in FIG. 24. Thus, the four second electrodes 213B described above are the second shared electrodes 218B. As illustrated in FIG. 25, the second space SP2 in which the magnetic field is generated during the antenna period AP is disposed to overlap the fourth second electrode 213B, the fifth second electrode 213B, the sixth second electrode 213B, and the seventh second electrode 213B counting from the left edge in FIG. 25. In other words, the width dimension of the second space SP2 is increased to approximately twice that in FIG. 21.

Further, as illustrated in FIG. 25, the range of the overlapping space OSP in which the first space SP1 and the second space SP2 overlap and a particularly strong magnetic field is generated is expanded to two times that in FIG. 21 in both the X-axis direction and the Y-axis direction. As a result, the range in which the magnetic field generated in the overlapping space OSP is enhanced expands. This increases the range in which near field wireless communication is stably performed and improves design flexibility of software used to perform signal processing in accordance with near field wireless communication. In this manner, the position at which the antenna function is achieved and the range in which the antenna function is achieved on the plate surface of the touch panel 212 can be changed as appropriate by changing the pattern that determines which external connection wiring line switch 25, short-circuit wiring line switch 26 and short-circuit switch 28 among the plurality of external connection wiring line switches 25, short-circuit wiring line switches 26 and short-circuit switches 28 is to be connected to the external connection wiring line 219 and the short-circuit wiring line 220. Note that the specific combinations of the patterns described above can be changed as appropriate to patterns other than those illustrated in FIGS. 23 to 25.

As described above, according to the present embodiment, the antenna circuit 216 includes at least the external connection wiring line 219 configured to connect two shared electrodes 218 included in the plurality of shared electrodes 218 to the external antenna controller AC, the short-circuit wiring line 220 configured to short-circuit the two shared electrodes 218 included in the plurality of shared electrodes 218 and separated by the spaces SP, and the plurality of switch connection portions 24 connected to a plurality of the switches 217 individually connected to the plurality of electrodes 213, the position detecting device including an antenna function further includes the electrode substrate 214 provided with at least the plurality of switches 217, and the external connection flexible substrate 222 provided with at least the external connection wiring line 219, the short-circuit wiring line 220, and the plurality of switch connection portions 24, the external connection flexible substrate 222 being mounted to the electrode substrate 214, and the external connection wiring line 219 and the short-circuit wiring line 220 are selectively connected to the plurality of switch connection portions 24. As described above, the external connection flexible substrate 222 provided with at least the external connection wiring lines 219, the short-circuit wiring lines 220, and the plurality of switch connection portions 24 is mounted to the electrode substrate 214 provided with at least the switches 217. The external connection wiring lines 219 constituting the antenna circuit 216 connect two shared electrodes 218 to the external antenna controller AC, and the short-circuit wiring lines 220 constituting the antenna circuit 216 cause the two shared electrodes 218 separated by the space SP to short-circuit. Thus, when the antenna circuit 216 and the plurality of shared electrodes 218 are energized by the external antenna controller AC, magnetic fields are generated in the spaces SP present between the plurality of shared electrodes 218. In a state where the external connection flexible substrate 222 is mounted to the electrode substrate 214, the plurality of switch connection portions 24 are connected to the plurality of switches 217 individually connected to the plurality of electrodes 213. In the external connection flexible substrate 222, the external connection wiring lines 219 and the short-circuit wiring lines 220 are selectively connected to the plurality of switch connection portions 24. Thus, a particular electrode 213 of the plurality of electrodes 213 can be set as the shared electrode 218 to perform the antenna function as appropriate. With this configuration, the location of the space SP in which the magnetic field is generated by the shared electrodes 218 can be changed even after the external connection flexible substrate 222 is mounted to the electrode substrate 214.

Further, the antenna circuit 216 includes the plurality of external connection wiring line switches 25 connected to each of the plurality of switch connection portions 24 and the external connection wiring line 219, the plurality of external connection wiring line switches 25 being configured to selectively connect one of the plurality of switch connection portions 24 to the external connection wiring line 219, and a plurality of short-circuit wiring line switches 26 connected to each of the plurality of switch connection portions 24 and the short-circuit wiring line 220, the plurality of short-circuit wiring line switches 26 being configured to selectively connect one of the plurality of switch connection portions 24 to the short-circuit wiring line 220, and the plurality of external connection wiring line switches 25 and the plurality of short-circuit wiring line switches 26 are provided on the external connection flexible substrate 222. With this configuration, the external connection wiring lines 219 and the short-circuit wiring lines 220 in the external connection flexible substrate 222 are selectively connected to any of the plurality of switch connection portions 24 by the plurality of external connection wiring line switches 25 and the short-circuit wiring line switches 26. Thus, by controlling the switching states of the plurality of external connection wiring line switches 25 and the short-circuit wiring line switches 26, a particular electrode 213 of the plurality of electrodes 213 can be set as the shared electrode 218 to perform the antenna function as appropriate. This makes it possible to easily change the location of the space SP in which the magnetic field is generated by the shared electrodes 218.

Further, the antenna circuit 216 includes at least the plurality of short-circuit wiring lines 220, the short-circuit changeover switch 221 individually connected to all of the plurality of electrodes 213 and connected to some of the plurality of short-circuit wiring lines 220, the short-circuit changeover switch 221 configured to switch conduction/non-conduction between the plurality of electrodes 213 and the plurality of short-circuit wiring lines 220, and the plurality of short-circuit switch connection portions (second switch connection portions) 27 connected to a plurality of the short-circuit changeover switches 221, the position detecting device including an antenna function further includes a short-circuit flexible substrate 223 provided with the plurality of short-circuit wiring lines 220 and not provided with the external connection wiring line 219, the short-circuit flexible substrate 223 being mounted to the electrode substrate 214 on a side opposite to the external connection flexible substrate 222, and, when the number of the plurality of shared electrodes 218 is 2n, two external connection wiring lines 219 and (n−1) short-circuit wiring lines 220 are provided on the external connection flexible substrate 222, n short-circuit wiring lines 220 and the plurality of short-circuit switch connection portions 27 are provided on the short-circuit flexible substrate 223, and the plurality of short-circuit wiring lines 220 are selectively connected to the plurality of short-circuit switch connection portions 27. When the external connection flexible substrate 222 is mounted to the electrode substrate 214, the two external connection wiring lines 219 and (n−1) short-circuit wiring lines 220 provided on the external connection flexible substrate 222 are selectively connected to 2n, that is, an even number of shared electrodes 218 via the switches 217 and the switch connection portions 24. On the other hand, when the short-circuit flexible substrate 223 is mounted to the electrode substrate 214 on a side opposite to the external connection flexible substrate 222, n short-circuit wiring lines 220 provided on the short-circuit flexible substrate 223 are selectively connected to an even number of shared electrodes 218 via the short-circuit changeover switches 221 and the short-circuit switch connection portions 27. The short-circuit flexible substrate 223 is provided with the short-circuit wiring lines 220 but not provided with the external connection wiring lines 219. The external connection wiring lines 219 are provided exclusively on the external connection flexible substrate 222. Thus, it is possible to avoid a case where two external connection wiring lines 219 are distributed between the external connection flexible substrate 222 and the short-circuit flexible substrate 223 as when the number of shared electrodes 218 is an odd number. Note that n is a natural number.

Further, the antenna circuit 216 includes the plurality of short-circuit switches (second short-circuit wiring line switches) 28 connected to the plurality of short-circuit switch connection portions 27 and the plurality of short-circuit wiring lines 220, the plurality of short-circuit switches 28 being configured to selectively connect one of the plurality of short-circuit switch connection portions 27 to the plurality of short-circuit wiring lines 220, and the plurality of short-circuit switches 28 are provided on the short-circuit flexible substrate 223. With this configuration, the short-circuit wiring lines 220 in the short-circuit flexible substrate 223 are selectively connected to any of the plurality of short-circuit switch connection portions 27 by the plurality of short-circuit switches 28. Thus, by controlling the switching states of the plurality of short-circuit switches 28, a particular electrode 213 of the plurality of electrodes 213 can be set as the shared electrode 218 to achieve the antenna function as appropriate. This makes it possible to easily change the location of the shared electrodes 218 and the spaces SP in which the magnetic fields are generated.

Fourth Embodiment

A fourth embodiment of the disclosure will be described with reference to FIG. 26 or 27. The fourth embodiment differs from the first embodiment in that only a first electrode substrate 314A is provided with the antenna function. Note that redundant descriptions of structures, actions, and effects similar to those of the first embodiment described above will be omitted.

Figure 26:
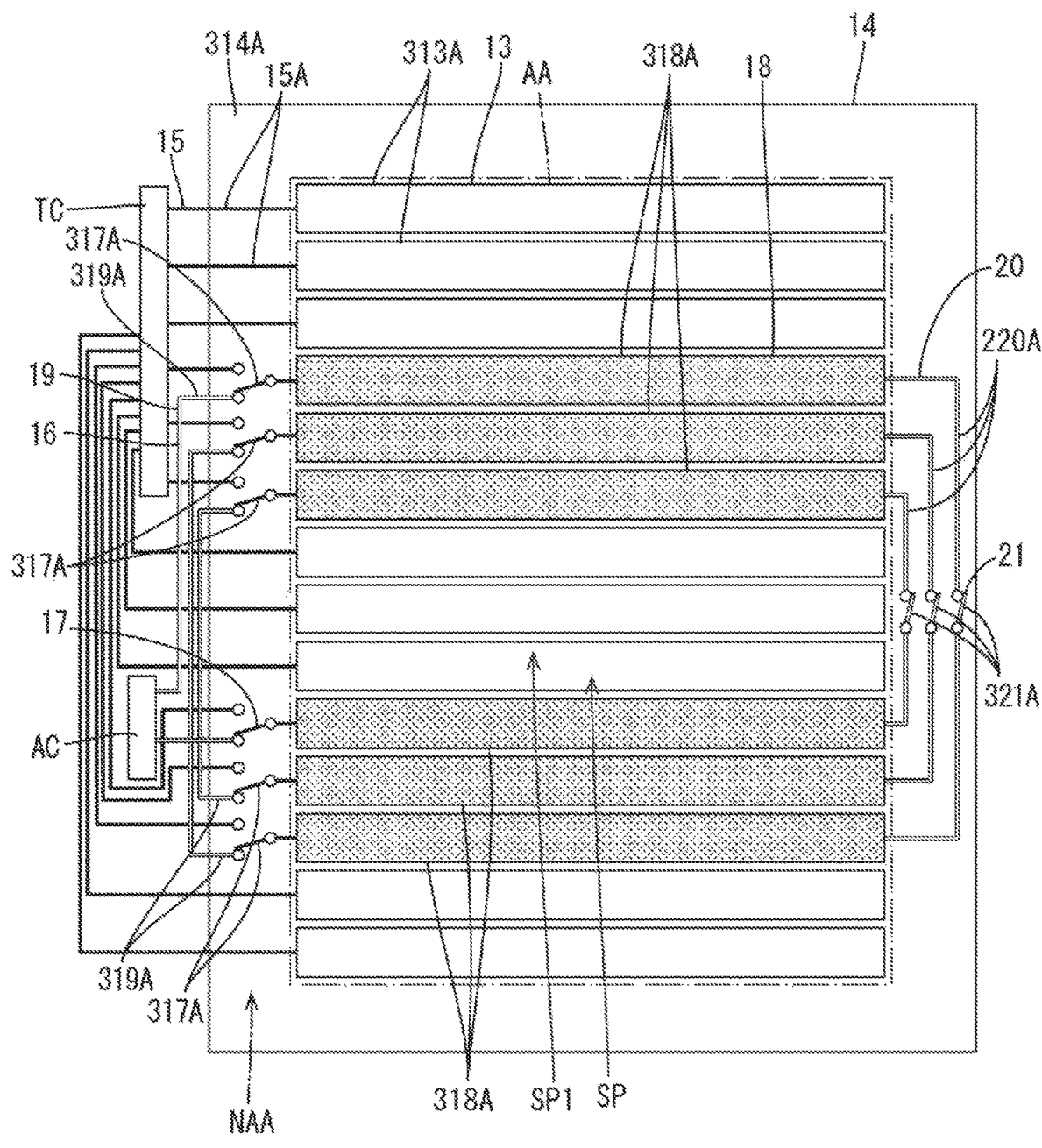
FIG. 26 is a plan view of a first electrode substrate constituting a touch panel according to a fourth embodiment of the disclosure.
Figure 27:
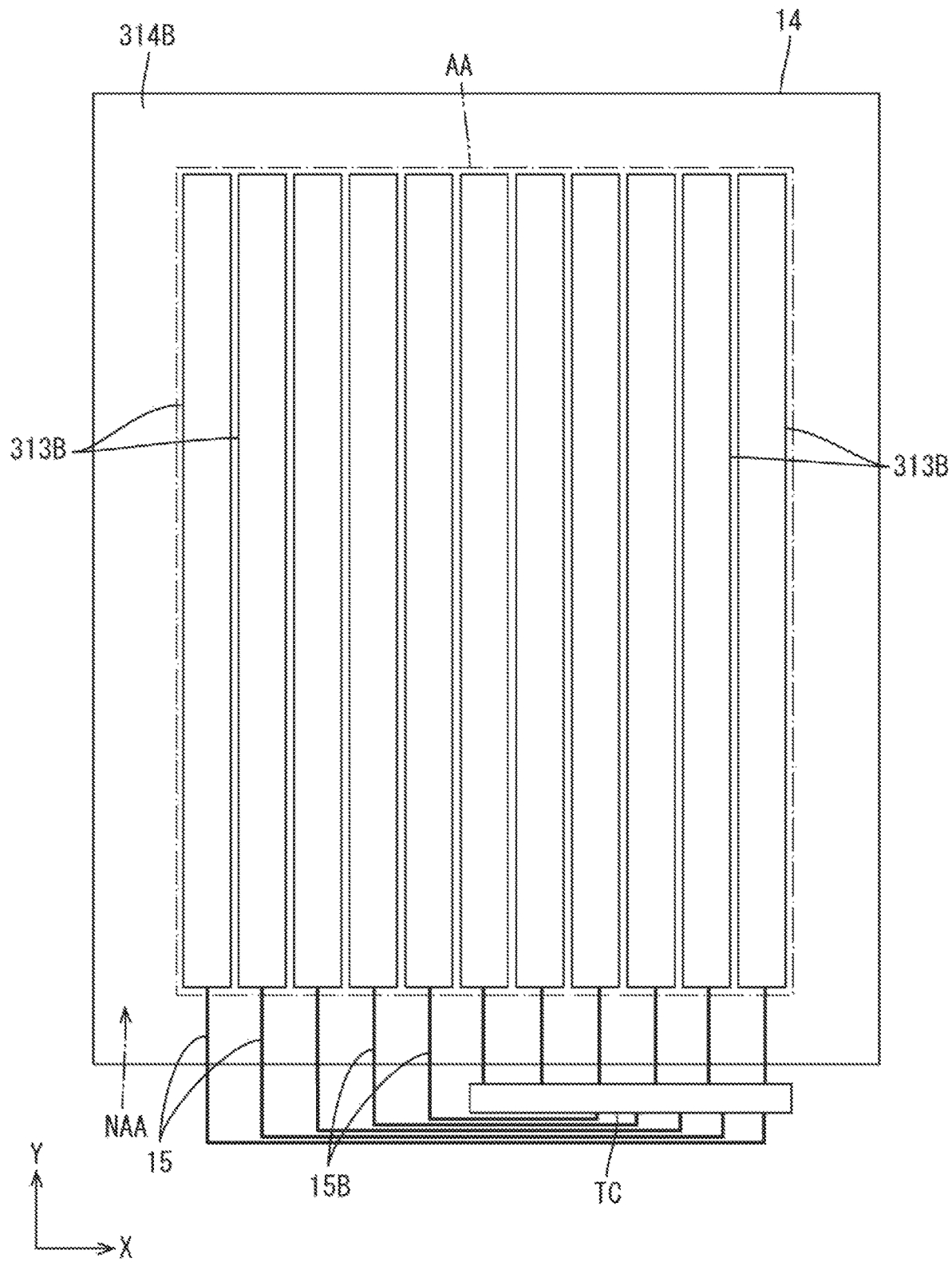
FIG. 27 is a plan view of a second electrode substrate constituting a touch panel.

As illustrated in FIG. 26, the first electrode substrate 314A according to the present embodiment is provided with a first switch 317A, a first external connection wiring line 319A, a first short-circuit wiring line 320A, and a first short-circuit changeover switch 321A that are similar to those described above in the first embodiment. Thus, a plurality of first electrodes 313A provided on the first electrode substrate 314A include a plurality of first shared electrodes 318A separated by the first spaces SP1 in which a magnetic field can be generated. The first space SP1 according to the present embodiment has a width dimension that overlaps three first electrodes 313A. In contrast, as illustrated in FIG. 27, a second electrode substrate 314B is provided with a plurality of second electrodes 313B but not provided with the second switches 17B, the second external connection wiring lines 19B, the second short-circuit wiring lines 20B and the second short-circuit changeover switches 21B (see FIG. 4) described above in the first embodiment. Thus, the plurality of second electrodes 313B only have a position detection function and not an antenna function. Even with such a configuration, the magnetic field generated in the first space SP1 can be used to perform near field wireless communication with an external device. Note that in the present embodiment, the width dimension of the first space SP1 is increased further than in first embodiment described above, which generates a stronger magnetic field. This is preferable from the perspective of obtaining high antenna performance.

Fifth Embodiment

A fifth embodiment of the disclosure will be described with reference to FIG. 28 or 29. The fifth embodiment is different from the third embodiment described above in terms of the configurations of flexible substrates 422, 423. Note that redundant descriptions of structures, actions, and effects similar to those of the third embodiment described above will be omitted.

Figure 28:
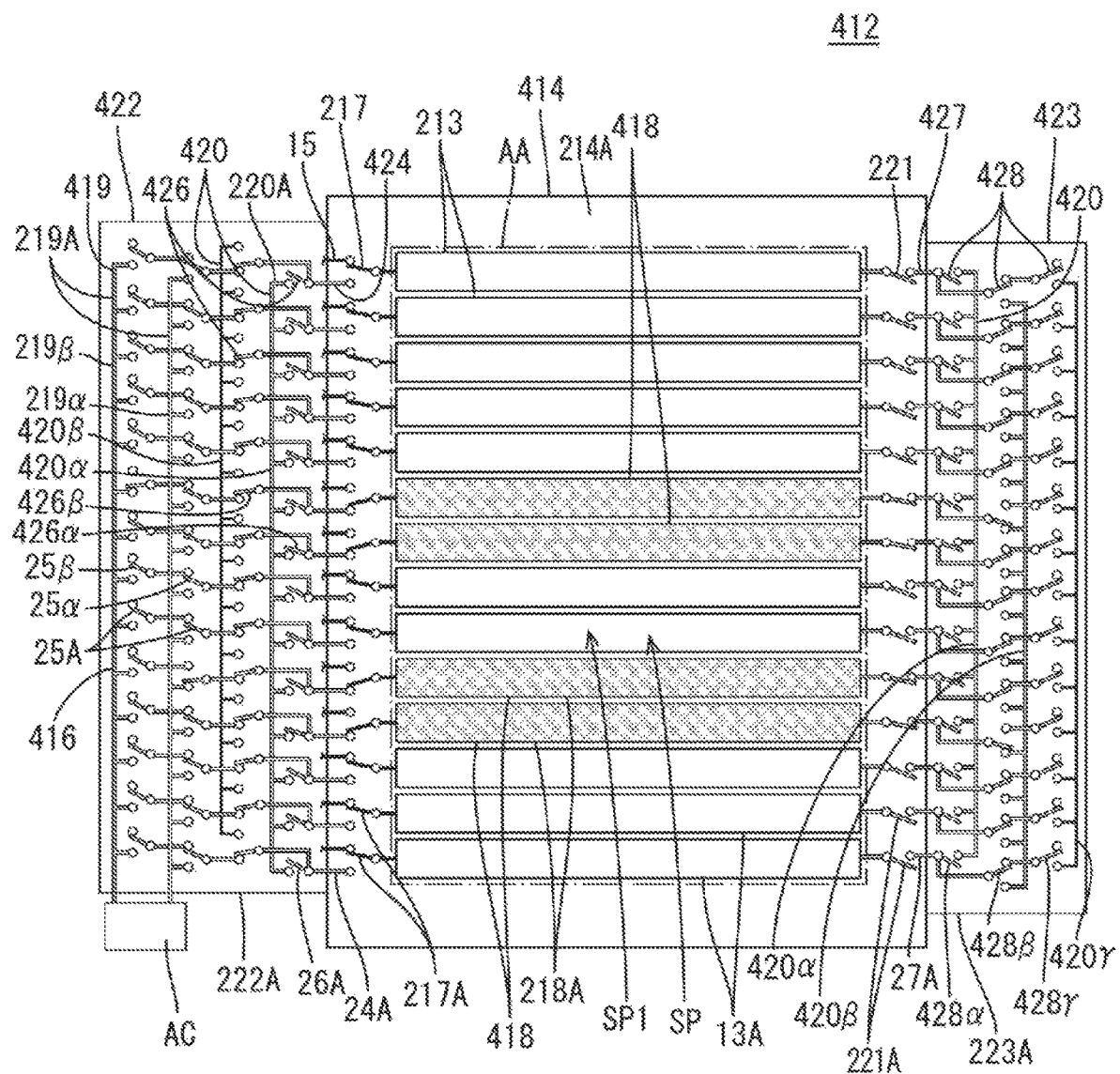
FIG. 28 is a plan view of a first electrode substrate constituting a touch panel according to a fifth embodiment of the disclosure.
Figure 29:
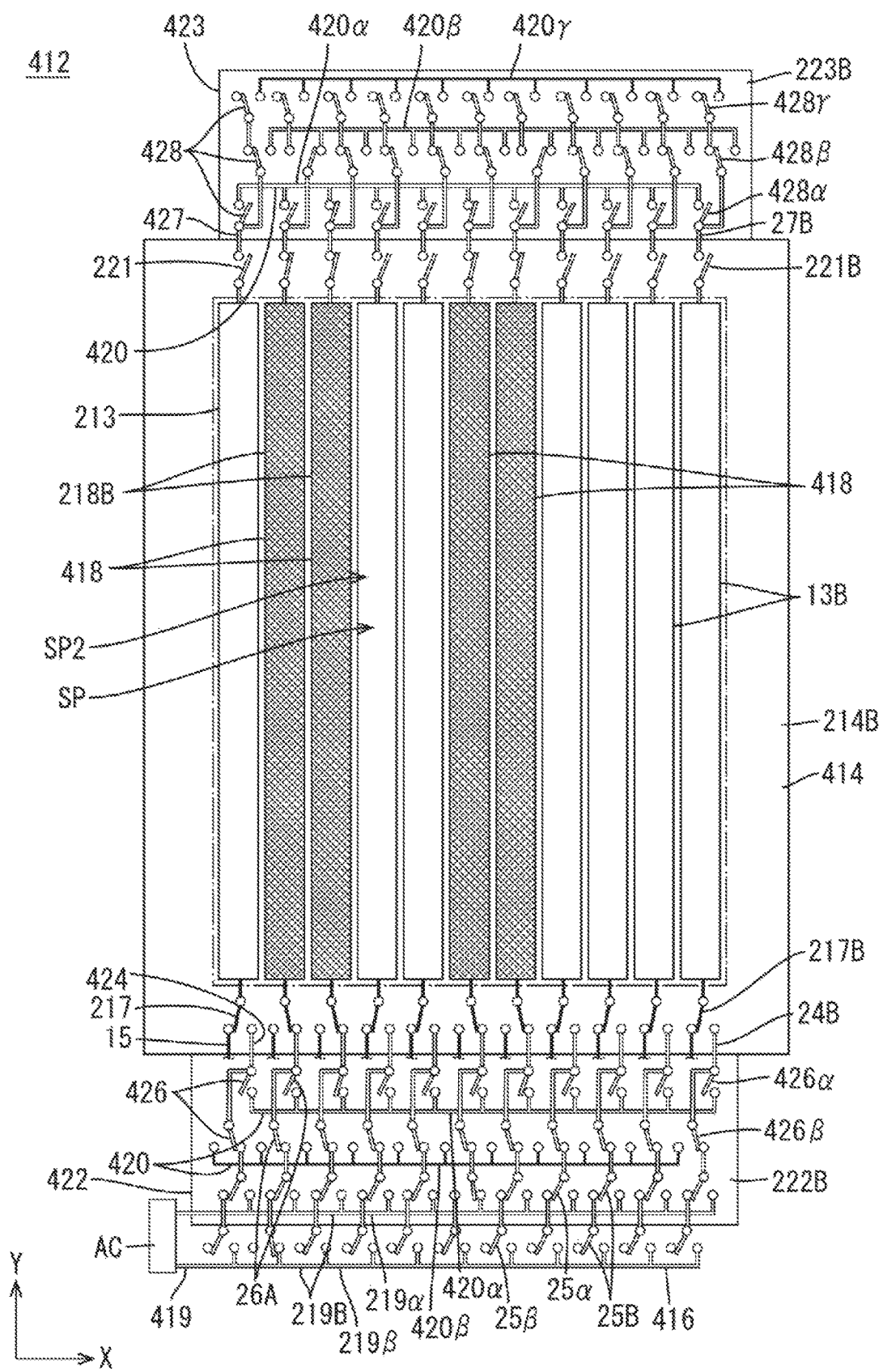
FIG. 29 is a plan view of a second electrode substrate constituting a touch panel.

As illustrated in FIGS. 28 and 29, two short-circuit wiring lines 420 are provided on the external connection flexible substrate 422 according to the present embodiment. The two short-circuit wiring lines 420 are arranged to be sandwiched between a switch connection portion 424 and an external connection wiring line 419. A short-circuit wiring line switch 426 is added to the external connection flexible substrate 422 when the short-circuit wiring lines 420 are added as described above. Note that in the present embodiment, when differentiating between two short-circuit wiring lines 420 disposed on the external connection flexible substrate 422, a short-circuit wiring line 420 disposed near the switch connection portion 424 in each drawing is denoted by adding the character "α" to the reference symbol to indicate a "first column short-circuit wiring line", and a short-circuit wiring line 420 disposed far from the switch connection portion 424) in each drawing is denoted by adding the character "β" to the reference symbol to indicate a "second column short-circuit wiring line". These symbols are not used when collectively referring to the two short-circuit wiring lines 420.

The short-circuit wiring line switch 426 includes a first column short-circuit wiring line switch 426α connected to a first column short-circuit wiring line 420α and a second column short-circuit wiring line switch 426β connected to a second column short-circuit wiring line 420β. The first column short-circuit wiring line switch 426α is connected to the switch connection portion 424 and the first column short-circuit wiring line 420α. The number of installed first column short-circuit wiring line switches 426α is the same as the number of installed switch connection portions 424. On the other hand, the two second column short-circuit wiring line switches 426β are connected to the first column short-circuit wiring line switch 426α and the second column short-circuit wiring line 420β. The number of installed second column short-circuit wiring line switches 426β is the same as the number of installed first column short-circuit wiring lines 426α.

In contrast, three short-circuit wiring lines 420 are provided on the short-circuit flexible substrate 423. A short-circuit switch 428 is also added to the short-circuit flexible substrate 423 when the short-circuit wiring lines 420 are added as described above. Note that in the present embodiment, when differentiating between three short-circuit wiring lines 420 disposed on the short-circuit flexible substrate 423, the short-circuit wiring line 420 disposed closest to the short-circuit switch connection portion 427 in each drawing is denoted by adding the character "α" to the reference symbol to indicate a "first column short-circuit wiring line", a second short-circuit wiring line 420 counting from the side of the short-circuit switch connection portion 427 in each drawing is denoted by adding the character "β" to the reference symbol to indicate a "second column short-circuit wiring line", and the short-circuit wiring line 420 disposed farthest from the short-circuit switch connection portion 427 in each drawing is denoted by adding the character "γ" to the reference symbol to indicate a "third column short-circuit wiring line". These symbols are not used when collectively referring to the three short-circuit wiring lines 420.

The short-circuit switch 428 includes a first column short-circuit switch 428α connected to the first column short-circuit wiring line 420α, a second column short-circuit switch 428β connected to the second column short-circuit wiring line 420β, and a third column short-circuit switch 428-γ connected to a third column short-circuit wiring line 420γ. The first column short-circuit switch 428α is connected to the short-circuit switch connection portion 427 and the first column short-circuit wiring line 420α. The number of installed first column short-circuit switches 428α is the same as the number of installed short-circuit switch connection portions 427. In contrast, the second column short-circuit switch 428β is connected to the first column short-circuit switch 428α and the second column short-circuit wiring line 420β. The number of installed second column short-circuit switches 428β is the same as the number of installed first column short-circuit switches 428α. Similarly, the third column short-circuit switch 428γ is connected to the second column short-circuit switch 428β and the third column short-circuit wiring line 420γ. The number of installed third column short-circuit switches 428γ is the same as the number of installed second column short-circuit switches 428β.

According to the configuration described above, the position at which the antenna function is achieved and the range in which the antenna function is achieved on the plate surface of the touch panel 412 can be changed as appropriate, and the number of shared electrodes 418 connected to the antenna circuit 416 can be changed by changing the pattern that determines which external connection wiring line switch 425, short-circuit wiring line switch 426 and short-circuit switch 428 among the plurality of external connection wiring line switches 425, short-circuit wiring line switches 426 and short-circuit switches 428 is to be connected to the external connection wiring lines 419 and the short-circuit wiring lines 420. That is, as illustrated in FIGS. 28 and 29, four shared electrodes 418 are generated in each electrode substrate 414 when only one of the two short-circuit wiring lines 420 provided on the external connection flexible substrate 422 is connected to the antenna circuit 416 via the short-circuit wiring line switch 426 and two of the three short-circuit wiring lines 420 provided on the short-circuit flexible substrate 423 are connected to the antenna circuit 416 via the short-circuit switch 428. In contrast, six shared electrodes 418 are generated in each electrode substrate 414 when both the short-circuit wiring lines 420 provided on the external connection flexible substrate 422 are connected to the antenna circuit 416 via the short-circuit wiring line switch 426 and all three short-circuit lines 420 provided on the short-circuit flexible substrate 423 are connected to the antenna circuit 416 via the short-circuit switch 428. By changing the number of shared electrodes 418 in this way, the strength of the magnetic fields generated in the spaces SP can be adjusted.

Other Embodiments

The disclosure is not limited to the embodiments described above and illustrated by the drawings, and embodiments such as those described below are also included within the technical scope of the disclosure.

(1) The electrode among the plurality of electrodes to be set as the shared electrode can be changed as appropriate to an electrode other than that illustrated in each of the embodiments described above.

(2) Each of the embodiments described above deals with an exemplary case where the number of shared electrodes is 4 or 6 (n=2), but the specific number of shared electrodes may be changed as appropriate. Even in this case, the number of shared electrodes (2n) is preferably set to an even number in terms of installing the external connection wiring lines on one flexible substrate (external connection flexible substrate), but this number may be different. That is, the number of shared electrodes may be an odd number (2n+1) greater than or equal to 3. As the number of shared electrodes is changed, the number of short-circuit wires may be changed accordingly.

(3) In Item (2) above, when the number of shared electrodes is an odd number of 3 or more, a configuration is adopted where "When the number of shared electrodes is 2n+1, one external connection wiring line and n short-circuit wiring lines are selectively connected to one end sides of the shared electrodes, and one external connection wiring line and n short-circuit wiring lines are selectively connected to other end sides of the shared electrodes." In this case, the two external connection wiring lines may be connected to two electrodes (shared electrodes) that are continuously aligned and have little space therebetween, but this need not always be the case.

(4) The specific number of electrodes that overlap the spaces can be changed as appropriate to a number other than that described above in the embodiments. The space may overlap one electrode or may overlap five or more electrodes. Further, the space may be arranged so as to not overlap an electrode.

(5) The first to third embodiments described above deal with an exemplary case where the number of first electrodes overlapping a first space and the number of second electrodes overlapping a second space are the same, but the number of first electrodes overlapping the first space and the number of second electrodes overlapping the second space may be different.

(6) The first to third embodiments described above deal with an exemplary case where the number of first shared electrodes and the number of second shared electrodes are the same, but the number of first shared electrodes and the number of second shared electrodes may be different.

(7) The embodiments described above deal with an exemplary case where the switch is provided on the electrode substrate, but the switch may be provided on an external circuit board (including an external connection flexible substrate or a short-circuit flexible substrate) that is directly or indirectly mounted to the electrode substrate.

(8) The specific planar shape of the pixel electrode can be changed as appropriate to a shape other than that described above in the embodiments. For example, the electrode may be square, rhombic, triangular, circular, or oval.

(9) The embodiments described above deal with an exemplary configuration where the first electrode substrate is layered on the front side of the second electrode substrate, but the layering order may be reversed.

(10) The embodiments described above deal with an exemplary configuration where the outer shape of the touch panel is a long rectangular shape, but the specific outer shape of the touch panel may be changed as appropriate. For example, the outer shape of the touch panel may be rectangular, square, circular, or oval.

(11) In each of the embodiments described above, the electrode is formed by using a mesh metal film formed on the plate surface of an electrode substrate, but the electrode may also be formed by using a transparent electrode film formed on the plate surface of the electrode substrate, for example.

(12) In addition to (11) above, the touch panel may be manufactured by using an imprint technique. Specifically, an imprint layer in a pre-cured state is formed first, a groove is formed on the front face of the imprint layer by pressing a mold against the imprint layer, and then the imprint layer is cured. The formation range of the groove is the same as the formation range of the electrode. Then, an electrode can be formed on the imprint layer provided that the groove is filled with conductive ink having electrical conductivity by using a squeegee or the like.

(13) The first embodiment described above deals with an exemplary case where the short-circuit changeover switch is provided partway along the short-circuit wiring line, but the short-circuit changeover switch may be provided so as to be interposed between the shared electrode and the short-circuit wiring line.

(14) The second and third embodiments described above deal with an exemplary case where only the switches and the short-circuit changeover switches connected to the shared electrodes are connected to the antenna circuit during the antenna period. However, all of the switches and short-circuit changeover switches may be switched to be connected to the antenna circuit during the antenna period.

(15) The embodiments described above deal with an exemplary case where the detection type of the touch panel pattern in the touch panel is a mutual-capacitance type, but the detection type of the touch panel pattern may be a self-capacitance type.

(16) The embodiments described above deal with an exemplary case where the touch panel is an out-cell panel installed separately from the liquid crystal panel, but the touch panel may be an in-cell panel in which electrodes (touch panel pattern) provided in the touch panel are included in the liquid crystal panel.

(17) The embodiments described above describe an exemplary transmissive liquid crystal display device including a backlight device that is an external light source, but the embodiment may be a reflective liquid crystal display device that performs display by using external light and, in this case, the backlight device may be omitted. Further, a semi-transparent liquid crystal display device may be used.

(18) The embodiments described above illustrate a liquid crystal display device including a liquid crystal panel as a display panel, but the embodiment may be an organic EL display device including an organic EL display panel as a display panel. The specific type of the display panel can be changed as appropriate to another type of display panel.

(19) The third and fifth embodiments described above deal with a case where one or two short-circuit wiring lines are provided on the external connection flexible substrate, and two or three short-circuit wiring lines are provided on the short-circuit flexible substrate, respectively. However, it is also possible to provide three or more short-circuit wiring lines in the external connection flexible substrate and provide four or more short-circuit wiring lines on the short-circuit flexible substrate. With this configuration, the range of adjustment related to the number of shared electrodes connected to the antenna circuit can be increased, and the range of adjustment related to the strength of the magnetic field generated in the space can be increased.

The invention claimed is:

1. A position detecting device including an antenna function, the position detecting device comprising:
    a plurality of electrodes including a plurality of shared electrodes separated by spaces;
    a position detection circuit configured to detect a position by energizing the plurality of electrodes and using electric fields generated between the plurality of electrodes;
    an antenna circuit configured to perform wireless communication by energizing the plurality of shared electrodes and using magnetic fields generated in the spaces;
    at least one switch connected to the plurality of shared electrodes among the plurality of electrodes, the position detection circuit, and the antenna circuit, the at least one switch being configured to selectively connect either the position detection circuit or the antenna circuit to the plurality of shared electrodes, wherein:
    the antenna circuit includes:
        a plurality of short-circuit wiring lines,
        a short-circuit changeover switch individually connected to all of the plurality of electrodes and connected to some of the plurality of short-circuit wiring lines, the short-circuit changeover switch being configured to switch conduction/non-conduction between the plurality of electrodes and the plurality of short-circuit wiring lines,
        an external connection wiring line configured to connect two shared electrodes included in the plurality of shared electrodes and separated by the spaces to an external antenna drive unit, and
        a short-circuit wiring line in the plurality of short-circuit wiring lines configured to short-circuit the two shared electrodes;
    a first substrate provided with the at least one switch;
    a second substrate mounted to the first substrate and provided with the antenna circuit, the external connection wiring line and the short-circuit wiring line being selectively connected to a particular switch depending on a mounting position at which the second substrate is mounted to the first substrate; and
    a third substrate provided with the plurality of short-circuit wiring lines and not provided with the external connection wiring line, the third substrate being mounted to the first substrate on a side opposite to the second substrate, wherein:
        when the number of the plurality of shared electrodes is 2n,
        two external connection wiring lines and (n−1) short-circuit wiring lines are provided on the second substrate,
        n short-circuit wiring lines are provided on the third substrate, and
        n is a natural number.

2. A display device comprising:
    the position detecting device according to claim 1; and
    a display panel layered on the position detecting device, the display panel including a display region in which an image is displayable, and a non-display region surrounding the display region,
    wherein the plurality of electrodes are disposed at positions overlapping the display region.

3. The position detecting device according to claim 1, wherein:
    the plurality of electrodes further include:
        a plurality of first electrodes extending in a first direction, and
        a plurality of second electrodes disposed overlapping the plurality of first electrodes and extending in a second direction intersecting the first direction,
    the plurality of shared electrodes include:
        a plurality of first shared electrodes included in the plurality of first electrodes and separated by first spaces, and
        a plurality of second shared electrodes included in the plurality of second electrodes and separated by second spaces that at least partially overlap the first spaces, and
    the at least one switch includes:
        a first switch connected to the plurality of first shared electrodes among the plurality of first electrodes, the position detection circuit, and the antenna circuit, the first switch being configured to selectively connect either the position detection circuit or the antenna circuit to the plurality of first shared electrodes, and
        a second switch connected to the plurality of second shared electrodes among the plurality of second electrodes, the position detection circuit, and the antenna circuit, the second switch being configured to selectively connect either the position detection circuit or the antenna circuit to the plurality of second shared electrodes.

4. A position detecting device including an antenna function, the position detecting device comprising:
    a plurality of electrodes including a plurality of shared electrodes separated by spaces;

a position detection circuit configured to detect a position by energizing the plurality of electrodes and using electric fields generated between the plurality of electrodes;

an antenna circuit configured to perform wireless communication by energizing the plurality of shared electrodes and using magnetic fields generated in the spaces;

at least one switch connected to the plurality of shared electrodes among the plurality of electrodes, the position detection circuit, and the antenna circuit, the at least one switch being configured to selectively connect either the position detection circuit or the antenna circuit to the plurality of shared electrodes, wherein:

the at least one switch is arranged to be selectively connected to the plurality of shared electrodes among the plurality of electrodes, the antenna circuit includes:
- a plurality of short-circuit wiring lines,
- a short-circuit changeover switch individually connected to all of the plurality of electrodes and connected to some of the plurality of short-circuit wiring lines, the short-circuit changeover switch being configured to switch conduction/non-conduction between the plurality of electrodes and the plurality of short-circuit wiring lines,
- a plurality of second switch connection portions connected to a plurality of short-circuit changeover switches including the short-circuit changeover switch,
- an external connection wiring line configured to connect two shared electrodes included in the plurality of shared electrodes and separated by the spaces to an external antenna drive unit,
- a short-circuit wiring line from the plurality of short-circuit wiring lines configured to short-circuit the two shared electrodes, and
- a plurality of switch connection portions connected to a plurality of switches individually connected to the plurality of electrodes;

a first substrate provided with at least the plurality of switches;

a second substrate provided with at least one of the external connection wiring line, the short-circuit wiring line, and the plurality of switch connection portions, the second substrate being mounted to the first substrate, wherein the external connection wiring line and the short-circuit wiring line are selectively connected to the plurality of switch connection portions; and a third substrate provided with the plurality of short-circuit wiring lines and not provided with the external connection wiring line, the third substrate being mounted to the first substrate on a side opposite to the second substrate, wherein:

when the number of the plurality of shared electrodes is 2n, two external connection wiring lines and (n−1) short-circuit wiring lines are provided on the second substrate, n short-circuit wiring lines and the plurality of second switch connection portions are provided on the third substrate, the plurality of short-circuit wiring lines are selectively connected to the plurality of second switch connection portions, and n is a natural number.

5. The position detecting device according to claim 4, wherein:

the antenna circuit further includes a plurality of short-circuit wiring line switches connected to the plurality of second switch connection portions and the plurality of short-circuit wiring lines, the plurality of short-circuit wiring line switches being configured to selectively connect one of the plurality of second switch connection portions to the plurality of short-circuit wiring lines, and the plurality of short-circuit wiring line switches are provided on the third substrate.

6. The position detecting device according to claim 4, wherein:

the plurality of electrodes further include:
- a plurality of first electrodes extending in a first direction, and
- a plurality of second electrodes disposed overlapping the plurality of first electrodes and extending in a second direction intersecting the first direction, the plurality of shared electrodes include:
- a plurality of first shared electrodes included in the plurality of first electrodes and separated by first spaces, and
- a plurality of second shared electrodes included in the plurality of second electrodes and separated by second spaces that at least partially overlap the first spaces, and the at least one switch includes:
- a first switch connected to the plurality of first shared electrodes among the plurality of first electrodes, the position detection circuit, and the antenna circuit, the first switch being configured to selectively connect either the position detection circuit or the antenna circuit to the plurality of first shared electrodes, and
- a second switch connected to the plurality of second shared electrodes among the plurality of second electrodes, the position detection circuit, and the antenna circuit, the second switch being configured to selectively connect either the position detection circuit or the antenna circuit to the plurality of second shared electrodes.

7. A display device comprising:

the position detecting device according to claim 4; and a display panel layered on the position detecting device including an antenna function, the display panel including a display region in which an image is displayable, and a non-display region surrounding the display region, wherein the plurality of electrodes are disposed at positions overlapping the display region.

* * * * *